US012357032B2

(12) United States Patent
Smith et al.

(10) Patent No.: US 12,357,032 B2
(45) Date of Patent: *Jul. 15, 2025

(54) E-VAPING DEVICE CARTRIDGE WITH INTERNAL CONDUCTIVE ELEMENT

(71) Applicant: Altria Client Services LLC, Richmond, VA (US)

(72) Inventors: Barry S. Smith, Richmond, VA (US); Ed Cadieux, Mechanicsville, VA (US); Patrick J. Cobler, Richmond, VA (US)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,333

(22) Filed: Jul. 25, 2022

(65) Prior Publication Data

US 2022/0354181 A1 Nov. 10, 2022

Related U.S. Application Data

(63) Continuation of application No. 16/372,879, filed on Apr. 2, 2019, now Pat. No. 11,425,937, which is a (Continued)

(51) Int. Cl.

*A24F 40/53* (2020.01)
*A24F 40/10* (2020.01)

(Continued)

(52) U.S. Cl.

CPC .............. *A24F 40/53* (2020.01); *A24F 40/42* (2020.01); *H05B 1/0244* (2013.01); *A24F 40/10* (2020.01)

(58) Field of Classification Search

None

See application file for complete search history.

(56) References Cited

U.S. PATENT DOCUMENTS 2,140,516 A * 12/1938 Cowan .................... F22B 1/284 392/338
3,730,674 A * 5/1973 Gross .................. F21V 37/0095 431/325

(Continued)

FOREIGN PATENT DOCUMENTS

CN 204191588 U 3/2015
CN 204560957 U 8/2015

(Continued)

OTHER PUBLICATIONS

Diane A. "What is Temperature Control?" http://vaporgallery.us/temperature-control-box-mods/ May 4, 2015, 5pp.

(Continued)

*Primary Examiner* — Thor S Campbell

(74) *Attorney, Agent, or Firm* — Harness, Dickey & Pierce, P.L.C.

(57) ABSTRACT

A cartridge for an e-vaping device includes a conductive element extending through an interior of a dispensing interface to which a heating element is coupled. The conductive element may have a greater temperature coefficient of electrical resistivity than the heating element. The dispensing interface may include a fibrous wicking material, and the conductive element may be woven through an interior of the fibrous wicking material. A temperature of the dispensing interface may be determined based on monitoring an electrical resistance of the conductive element. An amount of pre-vapor formulation may be determined based on an electrical resistance of the bridge electrical circuit to an electrical signal between the heating element and the conductive element through the dispensing interface.

17 Claims, 4 Drawing Sheets

Related U.S. Application Data continuation of application No. 15/067,537, filed on Mar. 11, 2016, now Pat. No. 10,278,423.

(51) Int. Cl.
*A24F 40/42* (2020.01)
*H05B 1/02* (2006.01)

(56) References Cited

U.S. PATENT DOCUMENTS 4,266,116 A * 5/1981 Bauer ...................... A45D 7/00 392/404
4,947,874 A 8/1990 Brooks et al.
5,222,185 A * 6/1993 McCord, Jr. .............. F22B 1/30 219/601
5,322,075 A 6/1994 Deevi et al.
5,382,410 A * 1/1995 Peltier ................... B05B 5/0255 239/34
5,529,485 A * 6/1996 D'Ambro ................. F23D 3/18 431/325
5,561,505 A * 10/1996 Lewis .................. G03G 13/025 361/225
6,325,475 B1 * 12/2001 Hayes .................. A61M 11/042 604/28
6,619,384 B2 * 9/2003 Moon ................... F28D 15/046 165/104.33
6,661,967 B2 12/2003 Levine et al.
6,792,199 B2 * 9/2004 Levine ...................... A61L 9/02 392/395
7,674,429 B2 * 3/2010 Lins .......................... A61L 9/04 261/99
8,499,766 B1 * 8/2013 Newton .................. A24F 40/51 131/273
8,794,231 B2 8/2014 Thorens et al.
8,820,330 B2 9/2014 Bellinger et al.
8,910,640 B2 12/2014 Sears et al.
8,997,754 B2 4/2015 Tucker et al.
9,603,386 B2 * 3/2017 Xiang ..................... A24F 40/50
9,675,114 B2 * 6/2017 Timmermans .......... A24F 40/60
9,808,032 B2 * 11/2017 Yamada ............... A61M 11/042
10,004,259 B2 * 6/2018 Sebastian ................ A24F 40/30
11,425,937 B2 * 8/2022 Smith ..................... A24F 40/42
2006/0196518 A1 9/2006 Hon
2007/0283972 A1 * 12/2007 Monsees ................. F23Q 3/002 131/273
2009/0095287 A1 * 4/2009 Emarlou ............... A61M 15/06 128/200.14
2010/0313901 A1 * 12/2010 Fernando ........... B65D 85/1081 131/330
2011/0036346 A1 * 2/2011 Cohen ..................... A24F 40/60 128/200.14
2012/0048266 A1 * 3/2012 Alelov ............. A61M 15/0066 128/203.14
2013/0042865 A1 * 2/2013 Monsees ................ A61M 11/00 128/203.27
2013/0104916 A1 * 5/2013 Bellinger ............. A61M 11/042 131/328
2013/0192619 A1 8/2013 Tucker et al.
2013/0192623 A1 8/2013 Tucker et al.
2013/0220316 A1 8/2013 Oglesby et al.
2013/0284192 A1 * 10/2013 Peleg ...................... A24F 40/53 131/329
2013/0319440 A1 * 12/2013 Capuano ................. A24F 40/50 131/329
2013/0340750 A1 12/2013 Thorens et al.
2013/0340775 A1 * 12/2013 Juster .................. H04L 12/1827 131/273
2014/0014126 A1 1/2014 Peleg et al.
2014/0053856 A1 * 2/2014 Liu ......................... A24F 40/51 131/329
2014/0107815 A1 * 4/2014 LaMothe ................ A24F 15/01 700/90
2014/0123989 A1 * 5/2014 LaMothe .......... A61M 15/0003 131/328
2014/0123990 A1 * 5/2014 Timmermans .......... A24F 40/60 131/328
2014/0174459 A1 * 6/2014 Burstyn .................. A24F 40/60 131/273
2014/0246035 A1 * 9/2014 Minskoff ................ A24F 40/65 131/329
2014/0251324 A1 * 9/2014 Xiang ..................... A24F 40/50 128/202.21
2014/0305820 A1 * 10/2014 Xiang ..................... A24F 40/95 206/236
2014/0334804 A1 * 11/2014 Choi ..................... A24F 40/485 392/404
2014/0360512 A1 * 12/2014 Xiang ..................... A24F 40/50 131/328
2015/0020823 A1 1/2015 Lipowicz et al.
2015/0047662 A1 * 2/2015 Hopps ................... A61M 15/06 392/394
2015/0053217 A1 * 2/2015 Steingraber ............. A24F 40/50 131/329
2015/0075546 A1 * 3/2015 Kueny, Sr. .............. A24F 40/65 700/299
2015/0101625 A1 4/2015 Newton et al.
2015/0122252 A1 * 5/2015 Frija ....................... A24F 40/65 128/202.21
2015/0136158 A1 * 5/2015 Stevens ................... A24F 40/53 131/329
2015/0173124 A1 * 6/2015 Qiu ......................... A24F 40/60 131/328
2015/0224268 A1 * 8/2015 Henry .................... G06Q 50/01 128/202.21
2015/0237917 A1 * 8/2015 Lord ....................... A24F 40/51 131/328
2015/0245661 A1 * 9/2015 Milin ...................... A24F 40/40 131/329
2015/0257445 A1 * 9/2015 Henry, Jr. ............... A24F 40/53 131/328
2015/0257448 A1 * 9/2015 Lord ....................... A24F 40/60 700/90
2015/0258289 A1 * 9/2015 Henry, Jr. ............... A24F 40/50 128/202.21
2015/0288468 A1 * 10/2015 Xiang ..................... A24F 40/65 455/500
2015/0313275 A1 11/2015 Anderson et al.
2015/0357839 A1 * 12/2015 Cai ......................... A24F 40/53 131/329
2015/0359263 A1 * 12/2015 Bellinger ............. H05B 1/0244 392/394
2016/0007651 A1 * 1/2016 Ampolini ................ A24F 40/65 131/328
2016/0021930 A1 * 1/2016 Minskoff ................ A24F 40/51 392/395
2016/0106156 A1 * 4/2016 Qiu ......................... A24F 40/53 392/404
2016/0219938 A1 * 8/2016 Mamoun ................ G05B 15/02
2016/0285983 A1 * 9/2016 Liu ......................... G16H 40/67
2016/0331024 A1 * 11/2016 Cameron ................ A24F 40/50
2016/0331026 A1 * 11/2016 Cameron ................ A24F 40/50
2016/0331027 A1 * 11/2016 Cameron ................ B05B 15/40
2016/0331035 A1 * 11/2016 Cameron ................ H04M 1/21
2016/0331859 A1 * 11/2016 Cameron ................ A24F 40/51
2016/0337362 A1 * 11/2016 Cameron ........... G06Q 20/3278
2016/0338407 A1 * 11/2016 Kerdemelidis ......... A24F 40/60
2016/0345628 A1 * 12/2016 Sabet ...................... H04M 1/21
2016/0360786 A1 * 12/2016 Bellinger ................ A24F 40/46
2016/0363917 A1 * 12/2016 Blackley ............... G06F 3/0488
2016/0374401 A1 * 12/2016 Liu ......................... A24F 40/50 131/328
2017/0042230 A1 * 2/2017 Cameron ................ A24F 40/60
2017/0042231 A1 * 2/2017 Cameron ................ A24F 40/65
2017/0045994 A1 * 2/2017 Murison ................. H02J 7/342
2017/0046357 A1 * 2/2017 Cameron ................ A24F 40/30
2017/0046738 A1 * 2/2017 Cameron ................ A24F 40/65
2017/0055588 A1 * 3/2017 Cameron .............. A61M 15/06
2017/0064999 A1 * 3/2017 Perez ..................... B65D 85/54
2017/0079327 A1 * 3/2017 Wu ....................... H05B 1/0244

(56) References Cited

U.S. PATENT DOCUMENTS

| | | | | |
|---|---|---|---|---|
| 2017/0079329 | A1* | 3/2017 | Zitzke | H05B 1/0225 |
| 2017/0086496 | A1* | 3/2017 | Cameron | B25F 1/04 |
| 2017/0086497 | A1* | 3/2017 | Cameron | H05B 1/0244 |
| 2017/0086503 | A1* | 3/2017 | Cameron | A24F 40/90 |
| 2017/0086504 | A1* | 3/2017 | Cameron | A24F 40/48 |
| 2017/0086505 | A1* | 3/2017 | Cameron | H01L 29/78693 |
| 2017/0086507 | A1* | 3/2017 | Rado | H05B 3/44 |
| 2017/0091490 | A1* | 3/2017 | Cameron | G06F 21/84 |
| 2017/0092106 | A1* | 3/2017 | Cameron | A24F 40/65 |
| 2017/0093960 | A1* | 3/2017 | Cameron | H04W 4/80 |
| 2017/0093981 | A1* | 3/2017 | Cameron | A24F 40/65 |
| 2017/0119058 | A1* | 5/2017 | Cameron | A24B 15/167 |
| 2017/0127727 | A1* | 5/2017 | Davidson | A61P 13/10 |
| 2017/0135400 | A1* | 5/2017 | Liu | A24F 40/53 |
| 2017/0135407 | A1* | 5/2017 | Cameron | A24F 40/60 |
| 2017/0135408 | A1* | 5/2017 | Cameron | A24F 40/51 |
| 2017/0135409 | A1* | 5/2017 | Cameron | A24F 1/02 |
| 2017/0135410 | A1* | 5/2017 | Cameron | H01M 10/44 |
| 2017/0135411 | A1* | 5/2017 | Cameron | A24F 40/50 |
| 2017/0135412 | A1* | 5/2017 | Cameron | A24F 40/51 |
| 2017/0136193 | A1* | 5/2017 | Cameron | A24F 40/48 |
| 2017/0136194 | A1* | 5/2017 | Cameron | A24F 40/05 |
| 2017/0136301 | A1* | 5/2017 | Cameron | A24F 40/65 |
| 2017/0143917 | A1* | 5/2017 | Cohen | A24F 40/40 |
| 2017/0150756 | A1* | 6/2017 | Rexroad | H05B 1/0244 |
| 2017/0157341 | A1* | 6/2017 | Pandya | A61M 15/009 |
| 2017/0181467 | A1* | 6/2017 | Cameron | A63F 13/98 |
| 2017/0181474 | A1* | 6/2017 | Cameron | A24B 15/167 |
| 2017/0181475 | A1* | 6/2017 | Cameron | A24F 40/53 |
| 2017/0185364 | A1* | 6/2017 | Cameron | G09G 5/12 |
| 2017/0196270 | A1* | 7/2017 | Vick | H02J 7/0042 |
| 2017/0208867 | A1* | 7/2017 | Li | G08C 17/02 |
| 2017/0215480 | A1* | 8/2017 | Qiu | A24F 40/65 |
| 2017/0224020 | A1* | 8/2017 | Fernando | H02J 7/0013 |
| 2017/0231276 | A1 | 8/2017 | Mironov et al. | |
| 2017/0231280 | A1* | 8/2017 | Anton | A24F 40/65<br>392/404 |
| 2017/0245550 | A1* | 8/2017 | Freelander | A61M 15/0051 |
| 2017/0245554 | A1* | 8/2017 | Perez | H05B 1/0244 |
| 2017/0258136 | A1* | 9/2017 | Hawes | G08C 17/02 |
| 2017/0258142 | A1* | 9/2017 | Hatton | H05B 1/0244 |
| 2017/0259170 | A1* | 9/2017 | Bowen | A24F 40/60 |
| 2017/0273357 | A1* | 9/2017 | Barbuck | H05B 3/04 |
| 2017/0280779 | A1* | 10/2017 | Qiu | G05D 23/1919 |
| 2017/0290998 | A1* | 10/2017 | Poston | A61M 11/047 |
| 2017/0295844 | A1* | 10/2017 | Thevenaz | A24F 40/46 |
| 2017/0303590 | A1* | 10/2017 | Cameron | A24F 40/00 |
| 2017/0303593 | A1* | 10/2017 | Cameron | A24F 40/60 |
| 2017/0303594 | A1* | 10/2017 | Cameron | A61M 15/00 |
| 2017/0309091 | A1* | 10/2017 | Cameron | G07C 5/085 |
| 2017/0332702 | A1* | 11/2017 | Cameron | A24F 40/65 |

FOREIGN PATENT DOCUMENTS

| | | | |
|---|---|---|---|
| JP | H09-243425 | A | 9/1997 |
| WO | WO-2015/015431 | A1 | 2/2015 |
| WO | WO-2015/107552 | A1 | 7/2015 |

OTHER PUBLICATIONS

International Search Report and Written Opinion dated May 12, 2017 issued in corresponding International Application No. PCT/EP2017/055685.

Russian Notice of Allowance and Search Report dated May 13, 2020 for corresponding Russian Application No. 2018135732.

Chinese Office Action dated Sep. 14, 2020 for corresponding Chinese Patent Application No. 201780013423.9 and English translation thereof.

Indian Office Action dated Feb. 16, 2021 for corresponding Indian Application No. 201817024858, and English-language translation thereof.

Japanese Office Action dated Mar. 4, 2021 for corresponding Japanese Application No. 2018-546708, and English-language translation thereof.

Korean Office Action dated Aug. 25, 2021 for corresponding Korean Application No. 10-2018-7024951, and English-language translation thereof.

Japanese Notice of Allowance dated Jan. 4, 2022 for corresponding Japanese Application No. 2018-546708, and English-language translation thereof.

Korean Notice of Allowance dated Feb. 23, 2022 for corresponding Korean Application No. 10-2018-7024951, and English-language translation thereof.

English translation of Office Action dated Dec. 21, 2022, issued in corresponding Philippines Patent Application No. 1/2018/501783.

* cited by examiner

E-VAPING DEVICE CARTRIDGE WITH INTERNAL CONDUCTIVE ELEMENT

CROSS-REFERENCE TO RELATED APPLICATIONS

This application is a continuation application of U.S. application Ser. No. 16/372,879, filed on Apr. 2, 2019, which is a continuation application of U.S. application Ser. No. 15/067,537, filed on Mar. 11, 2016, the entire contents of each of which are hereby incorporated by reference.

BACKGROUND

Field

One or more example embodiments relate to electronic vaping and/or e-vaping devices.

Description of Related Art

E-vaping devices, also referred to herein as electronic vaping devices (EVDs) may be used by adult vapers for portable vaping. An e-vaping device may vaporize a pre-vapor formulation to form a vapor. The e-vaping device may include a reservoir that holds a pre-vapor formulation and a heating element that vaporizes the pre-vapor formulation by applying heat to at least a portion of the pre-vapor formulation.

In some cases, the heating element may generate excess heat, which may result in an increased temperature in one or more portions of the cartridge. The heating element may generate excess heat due to receiving excessive power for vapor generation. In some cases, the excess heat may be due to a reduction in the amount of pre-vapor formulation in the cartridge. Excessive heat, internal temperatures, etc. may result in an overheat condition in the cartridge. Overheating of the cartridge may result in degradation of one or more of the pre-vapor formulations, formation of one or more reaction products which may detract from the sensory experience when included in a vapor, etc.

SUMMARY

According to some example embodiments, a cartridge for an e-vaping device may include a reservoir configured to hold a pre-vapor formulation, a dispensing interface configured to draw the pre-vapor formulation from the reservoir, a heating element coupled to the dispensing interface, and a conductive element extending through an interior of the dispensing interface. The heating element may be configured to heat pre-vapor formulation drawn into the dispensing interface. The heating element may extend along an outer surface of the dispensing interface.

In some example embodiments, the conductive element may at least partially extend along a central longitudinal axis of the dispensing interface.

In some example embodiments, the dispensing interface may include a fibrous wicking material, and the conductive element may be woven through an interior of the fibrous wicking material.

In some example embodiments, the heating element may include a heater coil wire at least partially extending around an outer surface of the dispensing interface.

In some example embodiments, the heating element may have a first temperature coefficient of electrical resistivity, the conductive element may have a second temperature coefficient of electrical resistivity, and the second temperature coefficient of electrical resistivity may be greater than the first temperature coefficient of electrical resistivity.

In some example embodiments, the conductive element may have a temperature coefficient of electrical resistivity of at least about 1.5×10ˆ−4 microohms-m/° C. between temperatures of about 21° C. and about 327° C.

In some example embodiments, the conductive element may have a temperature coefficient of electrical resistance of at least 1.5 milliohms/° C. between temperatures of about 21° C. and about 327° C.

In some example embodiments, the dispensing interface may be configured to establish a bridge electrical circuit between the heating element and the conductive element when an amount of pre-vapor formulation drawn into the dispensing interface is greater than or equal to a threshold amount.

In some example embodiments, the cartridge may further include a sensor wire coupled to the dispensing interface separately from the conductive element and the heating element, the sensor wire being configured to carry an electrical signal propagating through the bridge electrical circuit.

According to some example embodiments, an e-vaping device may include a cartridge and a power supply. The cartridge may include a reservoir configured to hold a pre-vapor formulation, a dispensing interface configured to draw the pre-vapor formulation from the reservoir, a heating element coupled to the dispensing interface, and a conductive element extending through an interior of the dispensing interface. The heating element may be configured to heat pre-vapor formulation drawn into the dispensing interface. The heating element may extend along an outer surface of the dispensing interface. The power supply may be configured to selectively supply electrical power to the heating element.

In some example embodiments, the heating element may have a first temperature coefficient of electrical resistivity, the conductive element may have a second temperature coefficient of electrical resistivity, and the second temperature coefficient of electrical resistivity may be greater than the first temperature coefficient of electrical resistivity.

In some example embodiments, the e-vaping device may further include control circuitry. The control circuitry may be configured to determine an electrical resistance of the conductive element, determine a temperature of the dispensing interface based on the electrical resistance of the conductive element, and control the electrical power supplied to the heating element based on the temperature of the dispensing interface.

In some example embodiments, the control circuitry may be configured to control the electrical power supplied to the heating element to maintain the temperature of the dispensing interface below a threshold temperature.

In some example embodiments, the control circuitry may be configured to detect changes in the electrical resistance of the conductive element, the changes having a magnitude of at least one milliohm.

In some example embodiments, the dispensing interface may be configured to establish a bridge electrical circuit between the heating element and the conductive element when an amount of pre-vapor formulation drawn into the dispensing interface is greater than or equal to a threshold amount.

In some example embodiments, the e-vaping device may further include control circuitry configured to determine whether an amount of pre-vapor formulation in the cartridge is greater than or equal to a threshold amount based on whether the bridge electrical circuit is established between the heating element and the conductive element.

In some example embodiments, the e-vaping device may further include control circuitry configured to receive a bridge electrical signal, the bridge electrical signal being transmitted between the heating element and the conductive element through the bridge electrical circuit, determine an electrical resistance of the bridge electrical circuit based on the bridge electrical signal, and determine an amount of pre-vapor formulation in the cartridge based on the determined electrical resistance of the bridge electrical circuit.

In some example embodiments, the control circuitry may be configured to transmit an initial electrical signal through at least a portion of at least one of the conductive element and the heating element, and determine the amount of pre-vapor formulation in the cartridge based on both the initial electrical signal and the bridge electrical signal.

In some example embodiments, the e-vaping device may further include a sensor wire coupled to the dispensing interface separately from the conductive element and the heating element, the sensor wire being configured to carry the bridge electrical signal. The control circuitry may be configured to receive the bridge electrical signal through the sensor wire.

In some example embodiments, the power supply may include a rechargeable battery.

In some example embodiments, the cartridge and the power supply may be configured to be removably connected to each other.

According to some example embodiments, a method may include coupling a dispensing interface to a reservoir to configure the dispensing interface to draw a pre-vapor formulation from the reservoir, coupling a heating element to the dispensing interface such that the heating element extends along an outer surface of the dispensing interface, and the heating element is operable to heat pre-vapor formulation drawn into the dispensing interface, and configuring a conductive element to be within an interior of the dispensing interface such that the conductive element is configured to receive heat from the heating element through the interior of the dispensing interface.

In some example embodiments, the heating element may have a first temperature coefficient of electrical resistivity, the conductive element may have a second temperature coefficient of electrical resistivity, and the second temperature coefficient of electrical resistivity may be greater than the first temperature coefficient of electrical resistivity.

In some example embodiments, the method may further include electrically coupling control circuitry to at least the conductive element. The control circuitry may be configured to determine an electrical resistance of the conductive element, determine a temperature of the dispensing interface based on the electrical resistance of the conductive element, and control electrical power supplied to the heating element based on the temperature of the dispensing interface.

In some example embodiments, the method may further include electrically coupling control circuitry to at least the conductive element, the control circuitry configured to determine whether an amount of pre-vapor formulation in the reservoir is greater than or equal to a threshold amount based on whether the dispensing interface establishes a bridge electrical circuit between the heating element and the conductive element.

In some example embodiments, the method may further include electrically coupling control circuitry to at least the conductive element, the control circuitry configured to determine whether an amount of pre-vapor formulation in the reservoir is greater than or equal to a threshold amount based on whether an electrical resistance of a bridge electrical circuit between the heating element and the conductive element is less than a threshold amount.

In some example embodiments, the method may further include configuring the conductive element to be within the interior of the dispensing the interface such that the conductive element is configured to only receive heat from the heating element through the interior of the dispensing interface.

BRIEF DESCRIPTION OF THE DRAWINGS

The various features and advantages of the non-limiting embodiments described herein become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figure 1A:
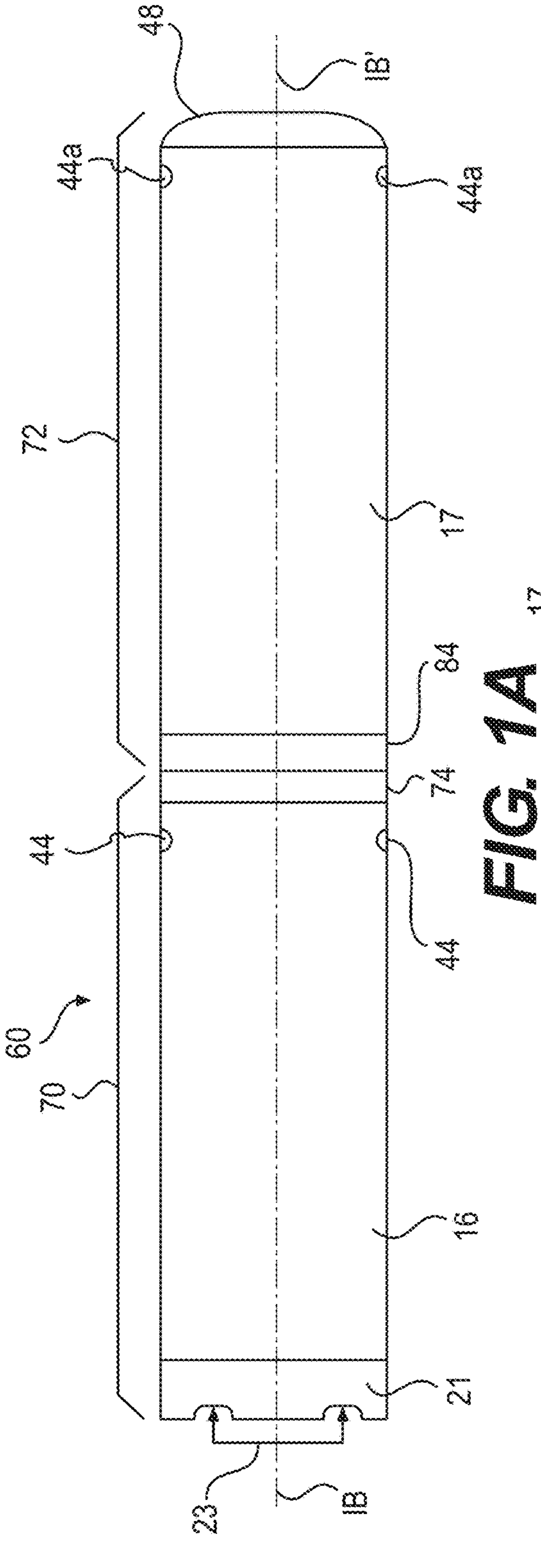
FIG. 1A is a side view of an e-vaping device according to some example embodiments.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, but do not preclude the presence or addition of one or more other features, integers, steps, operations, elements, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 1B:
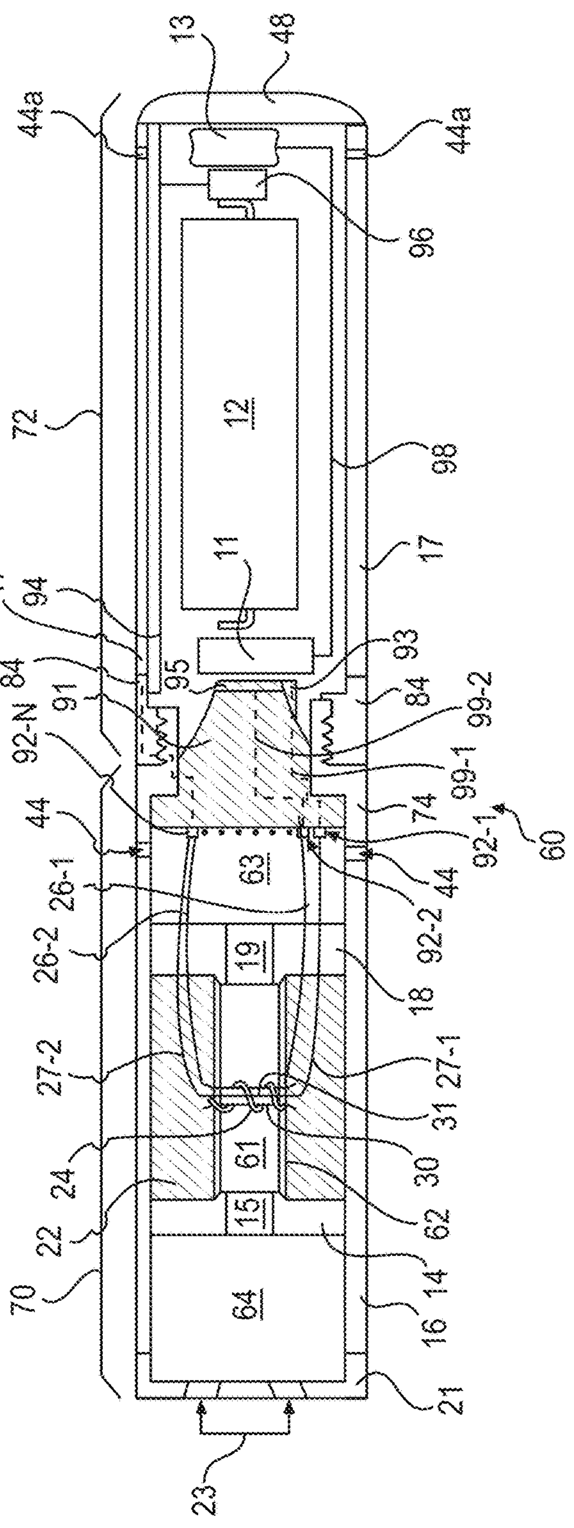
FIG. 1B is a cross-sectional view along line IB-IB' of the e-vaping device of FIG. 1A.

FIG. 1A is a side view of an e-vaping device 60 according to some example embodiments. FIG. 1B is a cross-sectional view along line IB-IB' of the e-vaping device of FIG. 1A. The e-vaping device 60 may include one or more of the features set forth in U.S. Patent Application Publication No. 2013/0192623 to Tucker et al. filed Jan. 31, 2013 and U.S. Patent Application Publication No. 2013/0192619 to Tucker et al. filed Jan. 14, 2013, the entire contents of each of which are incorporated herein by reference thereto. As used herein, the term "e-vaping device" is inclusive of all types of electronic vaping devices, regardless of form, size or shape.

Referring to FIG. 1A and FIG. 1B, an e-vaping device 60 includes a replaceable cartridge (or first section) 70 and a reusable power supply section (or second section) 72. Sections 70, 72 are removably coupled together at complimentary interfaces 74, 84 of the respective cartridge 70 and power supply section 72.

In some example embodiments, the interfaces 74, 84 are threaded connectors. It should be appreciated that each interface 74, 84 may be any type of connector, including a snug-fit, detent, clamp, bayonet, and/or clasp. One or more of the interfaces 74, 84 may include a cathode connector, anode connector, some combination thereof, etc. to electrically couple one or more elements of the cartridge 70 to one or more power supplies 12 in the power supply section 72 when the interfaces 74, 84 are coupled together.

As shown in FIG. 1A and FIG. 1B, in some example embodiments, an outlet end insert 21 is positioned at an outlet end of the cartridge 70. The outlet end insert 21 includes at least one outlet port 23 that may be located off-axis from the longitudinal axis of the e-vaping device 60. The at least one outlet port 23 may be angled outwardly in relation to the longitudinal axis of the e-vaping device 60. Multiple outlet ports 23 may be uniformly or substantially uniformly distributed about the perimeter of the outlet end insert 21 so as to uniformly or substantially uniformly distribute a vapor drawn through the outlet end insert 21 during vaping. Thus, as a vapor is drawn through the outlet end insert 21, the vapor may move in different directions.

The cartridge 70 includes an outer housing 16 extending in a longitudinal direction and an inner tube (or chimney) 62 coaxially positioned within the outer housing 16. The power supply section 72 includes an outer housing 17 extending in a longitudinal direction. In some example embodiments, the outer housing 16 may be a single tube housing both the cartridge 70 and the power supply section 72. In the example embodiment illustrated in FIG. 1A and FIG. 1B, the entire e-vaping device 60 may be disposable.

The outer housings 16, 17 may each have a generally cylindrical cross-section. In some example embodiments, the outer housings 16, 17 may each have a generally triangular cross-section along one or more of the cartridge 70 and the power supply section 72. In some example embodiments, the outer housing 17 may have a greater circumference or dimensions at a tip end than a circumference or dimensions of the outer housing 16 at an outlet end of the e-vaping device 60.

At one end of the inner tube 62, a nose portion of a gasket (or seal) 18 is fitted into an end portion of the inner tube 62. An outer perimeter of the gasket 18 provides a substantially airtight seal with an interior surface of the outer housing 16. The gasket 18 includes a channel 19. The channel 19 opens into an interior of the inner tube 62 that defines a central channel 61. A space 63 at a backside portion of the gasket 18 assures communication between the channel 19 and one or more air inlet ports 44. Air may be drawn into the space 63 in the cartridge 70 through the one or more air inlet ports 44 during vaping, and the channel 19 may enable such air to be drawn into the central channel 61.

In some example embodiments, a nose portion of another gasket 14 is fitted into another end portion of the inner tube 62. An outer perimeter of the gasket 14 provides a substantially tight seal with an interior surface of the outer housing 16. The gasket 14 includes a channel 15 disposed between the central channel 61 of the inner tube 62 and a space 64 at an outlet end of the outer housing 16. The channel 15 may transport a vapor from the central channel 61 to the space 64 to exit the cartridge 70 through the outlet end insert 21.

In some example embodiments, at least one air inlet port 44 is formed in the outer housing 16, adjacent to the interface 74 to reduce and/or minimize the chance of an adult vaper's fingers occluding one of the ports and to control the resistance-to-draw (RTD) during vaping. In some example embodiments, the air inlet ports 44 may be machined into the outer housing 16 with precision tooling such that their diameters are closely controlled and replicated from one e-vaping device 60 to the next during manufacture.

In a further example embodiment, the air inlet ports 44 may be drilled with carbide drill bits or other high-precision tools and/or techniques. In yet a further example embodiment, the outer housing 16 may be formed of metal or metal alloys such that the size and shape of the air inlet ports 44 may not be altered during manufacturing operations, packaging, and/or vaping. Thus, the air inlet ports 44 may provide more consistent RTD. In yet a further example embodiment, the air inlet ports 44 may be sized and configured such that the e-vaping device 60 has a RTD in the range of from about 60 mm $H_2O$ to about 150 mm $H_2O$.

Still referring to FIG. 1A and FIG. 1B, the cartridge 70 includes a reservoir 22. The reservoir 22 is configured to hold one or more pre-vapor formulations. The reservoir 22 is contained in an outer annulus between the inner tube 62 and the outer housing 16 and between the gaskets 14 and 18. Thus, the reservoir 22 at least partially surrounds the central channel 61. The reservoir 22 may include a storage medium configured to store the pre-vapor formulation therein. A storage medium included in a reservoir 22 may include a winding of cotton gauze or other fibrous material about a portion of the cartridge 70.

Still referring to FIG. 1A and FIG. 1B, the cartridge 70 includes a dispensing interface 30 coupled to the reservoir 22. The dispensing interface 30 is configured to draw one or more pre-vapor formulations from the reservoir 22. Pre-vapor formulation drawn from the reservoir 22 into the dispensing interface 30 may be drawn into an interior of the dispensing interface 30. It will be understood, therefore, that pre-vapor formulation drawn from a reservoir 22 into a dispensing interface 30 may include pre-vapor formulation held in the dispensing interface 30.

Still referring to FIG. 1A and FIG. 1B, the cartridge 70 includes a heating element 24. The heating element 24 may be coupled to the dispensing interface 30. In some example embodiments, the heating element 24 may be directly coupled to the dispensing interface 30 such that the heating element 24 is coupled to an exterior surface of the dispensing interface 30. The heating element 24 may at least partially surround a portion of the dispensing interface 30 such that when the heating element 24 is activated, one or more pre-vapor formulations in the dispensing interface 30 may be vaporized by the heating element 24 to form a vapor.

In some example embodiments, including the example embodiment illustrated in FIG. 1B, the heating element 24 completely surrounds the dispensing interface 30.

Figure 2B:
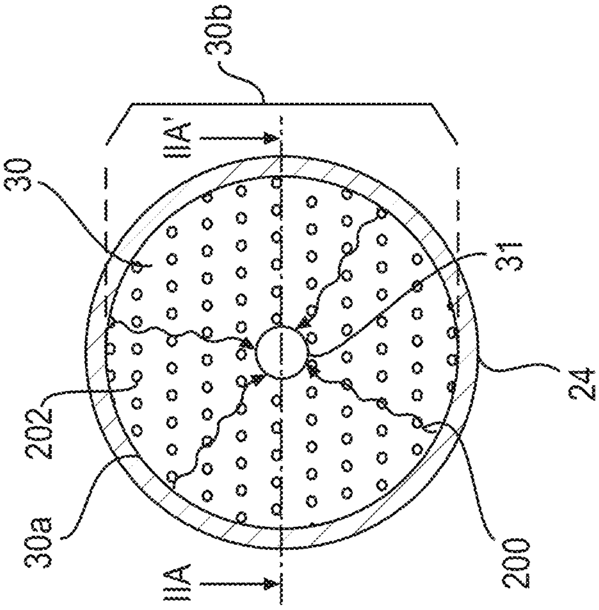
FIG. 2B is a cross-sectional view of a dispensing interface along line IIB-IIB' according to some example embodiments.
Figure 2A:
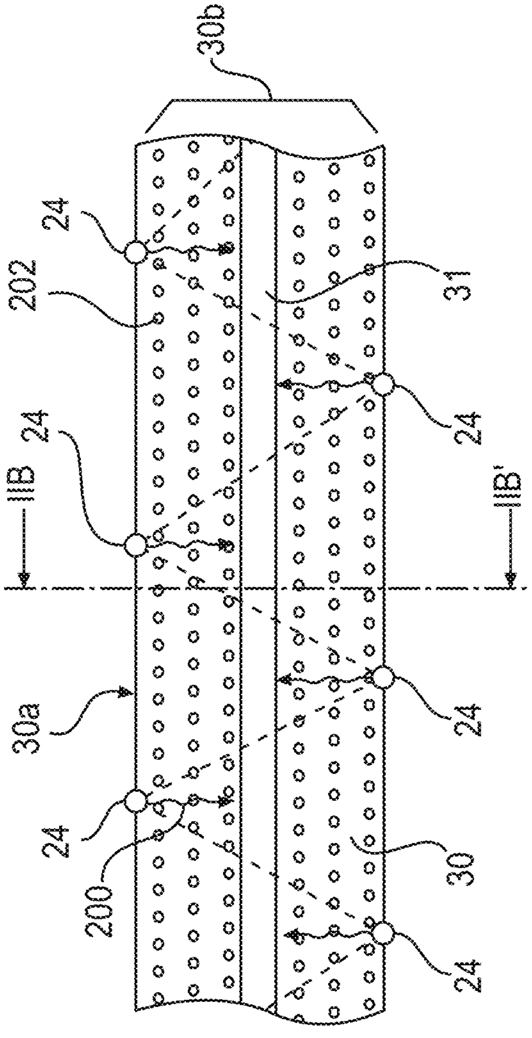
FIG. 2A is a cross-sectional view of a dispensing interface along line IIA-IIA' according to some example embodiments.

In some example embodiments, including the embodiment shown in FIG. 1B, and as shown further with reference to FIG. 2A and FIG. 2B, the heating element 24 includes a heater coil wire that extends around the exterior surface of the dispensing interface 30. The heating element 24 may heat one or more portions of the dispensing interface 30, including at least some of the pre-vapor formulation held in the dispensing interface 30, to vaporize the at least some of the pre-vapor formulation held in the dispensing interface 30.

The heating element 24 may heat one or more pre-vapor formulations in the dispensing interface 30 through thermal conduction. Alternatively, heat from the heating element 24 may be conducted to the one or more pre-vapor formulations by a heated conductive element or the heating element 24 may transfer heat to the incoming ambient air that is drawn through the e-vaping device 60 during vaping. The heated ambient air may heat the pre-vapor formulation by convection.

The dispensing interface 30 is configured to draw a pre-vapor formulation from the reservoir 22. The pre-vapor formulation drawn from the reservoir 22 into the dispensing interface 30 may be vaporized from the dispensing interface 30 based on heat generated by the heating element 24. During vaping, pre-vapor formulation may be transferred from the reservoir 22 and/or storage medium in the proximity of the heating element 24 through capillary action of the dispensing interface 30.

Still referring to FIG. 1A and FIG. 1B, the cartridge 70 includes a conductive element 31 extending through an interior of the dispensing interface 30. When the dispensing interface 30 includes a fibrous wicking material, the conductive element 31 may be woven through an interior of the fibrous wicking material.

The conductive element 31 may be heated by one or more portions of the dispensing interface 30, including pre-vapor formulation held in the dispensing interface 30. When the dispensing interface 30 and any pre-vapor formulation held therein are heated by the heating element 24, the conductive element 31 may be heated based on the heat generated by the heating element 24. A temperature of the conductive element 31 may be based on a temperature of one or more of the dispensing interface 30 and pre-vapor formulation held therein. In some example embodiments, a temperature of the conductive element 31 may be based on a temperature of the heating element 24.

In some example embodiments, the heating element 24 and the conductive element 31 have separate, respective temperature coefficients of electrical resistivity. The electrical resistivity of the heating element 24 may vary based on the temperature of the heating element 24 and the temperature coefficient of electrical resistivity of the heating element 24. The temperature coefficient of electrical resistivity of the heating element 24 may be referred to as a first temperature coefficient of electrical resistivity. The electrical resistivity of the conductive element 31 may vary based on the temperature of the conductive element 31 and the temperature coefficient of electrical resistivity of the conductive element 31. The temperature coefficient of electrical resistivity of the conductive element 31 may be referred to as a second temperature coefficient of electrical resistivity.

In some example embodiments, a temperature coefficient of electrical resistance of the conductive element 31 may be greater than a temperature coefficient of electrical resistance of the heating element 24. In some example embodiments, a temperature coefficient of electrical resistivity of the conductive element 31 may be greater than a temperature coefficient of electrical resistivity of the heating element 24. For example, the temperature coefficient of electrical resistivity of the conductive element 31 may be at least about 1.5×10^−4 microohms-m/° C. between temperatures of about 21° C. and about 327° C.

In some example embodiments, a temperature coefficient of electrical resistance of the conductive element 31 may be substantially common with a temperature coefficient of electrical resistance of the heating element 24. In some example embodiments, a temperature coefficient of electrical resistivity of the conductive element 31 may be substantially common with a temperature coefficient of electrical resistivity of the heating element 24.

In some example embodiments, the heating element 24 and the conductive element 31 have separate, respective temperature coefficients of electrical resistance. The electrical resistance of the heating element 24 may vary based on the temperature of the heating element 24 and the temperature coefficient of electrical resistance of the heating element 24. The electrical resistance of the conductive element 31 may vary based on the temperature of the conductive element 31 and the temperature coefficient of electrical resistance of the conductive element 31. For example, the temperature coefficient of electrical resistance of the conductive element 31 may be at least 1.5 milliohms/OC between temperatures of about 21° C. and about 327° C.

In some example embodiments, the conductive element 31 includes a wire material. The wire material may be at least one of Nikrothal 42, 35 AWG; Nikrothal 42, 36 AWG; Inconel 825, 35 AWG; Inconel 825, 36 AWG; Haynes Alloy 556, 35 AWG; Haynes Alloy 556, 37 AWG; Nikrothal TE, 34 AWG; Nikrothal TE, 36 AWG; Nikrothal 20, 35 AWG; Nikrothal 20, 37 AWG; Chronifer 40B, 35 AWG; Chronifer 40B, 36 AWG; Inconel 718, 34 AWG; Inconel 718, 36 AWG; Nikrothal 60, 35 AWG; and Nikrothal 60, 36 AWG.

In some example embodiments, the greater temperature coefficient of electrical resistivity of the conductive element 31, relative to the temperature coefficient of electrical resistivity of the heating element 24, enables the conductive element 31 to be more suitably optimized for sensitivity of resistance and resistivity to temperature changes across a range of temperatures and the heating element 24 to be more suitably optimized for electrical resistance across a range of temperatures. As a result, sensitivity of electrical resistance of the heating element 24 to temperature changes across a range of temperatures may be reduced, relative to the sensitivity of electrical resistance of the conductive element 31 to temperature changes across a range of temperatures.

In some example embodiments, when the temperature coefficient of electrical resistivity of the conductive element 31 (also referred to herein as a second temperature coefficient of electrical resistivity) is greater than the temperature coefficient of electrical resistivity of the heating element 24 (also referred to herein as a first temperature coefficient of electrical resistivity), the conductive element 31 may be configured to enable improved determination of a temperature of one or more portions of the dispensing interface 30, including pre-vapor formulation held in the dispensing interface 30, by measuring the electrical resistance of the conductive element 31. The magnitude of a change of electrical resistance of the conductive element 31 according to changes in temperature of the conductive element 31 may be greater than the magnitude of a change of electrical resistance of the heating element 24 according to changes in temperature of the heating element 24. Therefore, a determination of dispensing interface 30 temperature based on a measured electrical resistance of the conductive element 31 may be more accurate than a determination of dispensing interface 30 temperature based on a measured electrical resistance of the heating element 24.

Improved accuracy of temperature determinations may enable improved control of temperature in one or more portions of the e-vaping device 60 and may mitigate a probability of overheating of one or more of the dispensing interface 30 and pre-vapor formulation held in the dispensing interface 30. Overheating of the pre-vapor formulation may result in degradation of the pre-vapor formulation. Such degradation may occur based on chemical reactions involving the pre-vapor formulation. Vapors generated based on vaporization of a non-degraded pre-vapor formulation may provide an improved sensory experience relative to vapors generated based on vaporization of an at least partially degraded pre-vapor formulation. Therefore, an e-vaping device 60 configured to determine temperatures in the dispensing interface 30 based on an electrical resistance of the conductive element 31 may be configured to provide an improved sensory experience based on mitigating a probability of pre-vapor formulation overheating.

Still referring to FIG. 1A and FIG. 1B, the cartridge 70 includes a connector element 91 configured to establish electrical connections between elements in the cartridge 70 and one or more elements in the power supply section 72. Connector element 91 may include one or more sets of pin connectors 92-1 to 92-N, where 'N' is a positive integer. Various elements in the cartridge 70 may be coupled to the pin connectors 92-1 to 92-N. In some example embodiments, the connector element 91 includes an electrode element configured to electrically couple at least one pin connector 92-1 to 92-N to the power supply 12 in the power supply section 72 when interfaces 74, 84 are coupled together.

In some example embodiments, the connector element 91 includes an electrode element configured to electrically couple at least one pin connector 92-1 to 92-N to the power supply 12 through another element in the power supply section 72 when interfaces 74, 84 are coupled together. In the example embodiment illustrated in FIG. 1B, connector element 91 is configured to couple with control circuitry 11 when interfaces 74, 84 are coupled together. Control circuitry 11 may include one or more electrode elements, such that the connector element 91 and control circuitry 11 may electrically couple one or more connector pin connectors 92-1 to 92-N to the power supply 12 when interfaces 74, 84 are coupled together.

For example, leads 26-1 and 27-1 are coupled to pin connectors 92-2 and 92-1 of connector element 91, respectively. An electrode element may be one or more of a cathode connector element and an anode connector element. If and/or when interfaces 74, 84 are coupled together, the connector element 91 may be coupled with at least one portion of the control circuitry 11 to electrically couple pin connectors 92-1 and 92-2 to power supply 12 through the control circuitry 11, as shown in FIG. 1B.

In the example embodiment illustrated in FIG. 1B, the heating element 24 is coupled to pin connectors 92-2 and 92-N through respective electrical leads 26-1 and 26-2. In addition, as also shown, the conductive element 31 is coupled to pin connectors 92-1 and 92-N through respective electrical leads 27-1 and 27-2. In some example embodiments, one or more of the interfaces 74, 84 include one or more of a cathode connector element and an anode connector element. In the example embodiment illustrated in FIG. 1B, for example, pin connector 92-N is coupled to the interface 74 such that leads 26-2 and 27-2 are coupled to interface 74. As further shown in FIG. 1B, the power supply section 72 includes a lead 94 that couples an electrode element 96 to the interface 84. Electrode element 96 is configured to couple lead 94 to power supply 12. If and/or when interfaces 74, 84 are coupled together, the coupled interfaces 74, 84 may electrically couple leads 26-2 and 27-2 to lead 94.

If and/or when interfaces 74, 84 are coupled together, one or more electrical circuits through the cartridge 70 and power supply section 72 may be established. The established electrical circuits may include at least the heating element 24, the conductive element 31, control circuitry 11, and the power supply 12. The electrical circuit may include leads 26-1 and 26-2, leads 27-1 and 27-2, lead 94, and interfaces 74, 84.

In the example embodiment illustrated in FIG. 1B, connector element 91 includes separate electrode elements 93, 95. Connector element 91 further includes separate electrical pathways 99-1 and 99-2 coupled to separate, respective pin connectors 92-1 and 92-2 to separate, respective electrode elements 93, 95. The connector element 91 may restrict the pathways 99-1 and 99-2 from intersecting. Thus, pathways 99-1 and 99-2 may be separate, independent electrical circuits. If and/or when interfaces 74, 84 are coupled together, connector element 91 may couple pin connector 92-2 to the control circuitry 11 through pathway 99-2 and may couple pin connector 92-1 to the control circuitry 11 through the pathway 99-1 that extends at least partially through electrode element 93. The control circuitry 11 may include separate electrode elements configured to couple with separate ones of the electrode elements 93, 95.

The control circuitry 11, described further below, is configured to be coupled to the power supply 12, such that the control circuitry 11 may control the supply of electrical power from the power supply 12 to one or more elements of the cartridge 70. The control circuitry 11 may control the supply of electrical power to the element based on controlling the established electrical circuit. For example, the control circuitry 11 may selectively open or close the electrical circuit, adjustably control an electrical current through the circuit, etc.

In some example embodiments, the control circuitry 11 is configured to control the supply of electrical power from power supply 12 to separate electrode elements 93, 95 through the control circuitry 11 to control the supply of electrical power to separate elements coupled to separate electrode elements 93, 94. In the example embodiment illustrated in FIG. 1B, for example, the control circuitry 11 may control the supply of electrical power to electrode element 93 to control the supply of electrical power to the electrode element 93. In another example, the control circuitry 11 may control the supply of electrical power to electrode element 95 to control the supply of electrical power to the heating element 24.

In some example embodiments, electrical lead 27-2 is coupled to a common pin connector of connector element 91 as an electrical lead 26-2 of the heating element 24. As shown in FIG. 1B, for example, electrical leads 27-2 and 26-2 are coupled to a common pin connector 92-N. Where pin connector 92-N is an electrical ground pin, the electrical leads 27-2 and 26-2 may be coupled to pin connector 92-N to respectively electrically couple the conductive element 31 and the heating element 24 to an electrical ground.

Still referring to FIG. 1A and FIG. 1B, the power supply section 72 includes a sensor 13 responsive to air drawn into the power supply section 72 through an air inlet port 44*a* adjacent to a free end or tip end of the e-vaping device 60, a power supply 12, and control circuitry 11. In some example embodiments, including the example embodiment illustrated in FIG. 1B, the sensor 13 may be coupled to control circuitry 11 through lead 98. In some example embodiments, the sensor 13 may be coupled to control circuitry 11 through the electrode element 96 and the power supply 12. The power supply 12 may include a rechargeable battery. The sensor 13 may be one or more of a pressure sensor, a microelectromechanical system (MEMS) sensor, etc.

In some example embodiments, the power supply 12 includes a battery arranged in the e-vaping device 60 such that the anode is downstream of the cathode. A connector element 91 contacts the downstream end of the battery. The heating element 24 is connected to the power supply 12 by two spaced apart electrical leads 26-1 to 26-2 coupled to separate pin connectors 92-2 to 92-N of a connector element 91. In some example embodiments, pin connector 92-N is an electrical ground pin, such that an electrical lead 26-2 coupled to pin connector 92-N electrically couples the heating element 24 to an electrical ground. In some example embodiments, pin connector 92-2 is electrically coupled to the power supply 12 through connector element 91, such that an electrical lead 26-1 coupled to pin connector 92-2 electrically couples the heating element 24 to the power supply 12.

The power supply 12 may be a Lithium-ion battery or one of its variants, for example a Lithium-ion polymer battery. Alternatively, the power supply 12 may be a nickel-metal hydride battery, a nickel cadmium battery, a lithium-manganese battery, a lithium-cobalt battery or a fuel cell. The e-vaping device 60 may be usable until the energy in the power supply 12 is depleted or in the case of lithium polymer battery, a minimum voltage cut-off level is achieved.

Further, the power supply 12 may be rechargeable and may include circuitry configured to allow the battery to be chargeable by an external charging device. To recharge the e-vaping device 60, a Universal Serial Bus (USB) charger or other suitable charger assembly may be used.

Still referring to FIG. 1A and FIG. 1B, upon completing the connection between the cartridge 70 and the power supply section 72, the power supply 12 may be electrically connected with the heating element 24 of the cartridge 70 upon actuation of the sensor 13. Air is drawn primarily into the cartridge 70 through one or more air inlet ports 44. The one or more air inlet ports 44 may be located along the outer housing 16 or at one or more of the interfaces 74, 84.

Upon completing the connection between the cartridge 70 and the power supply section 72, the control circuitry 11 may electrically connect at least one power supply 12 with the heating element 24 of the cartridge 70 through at least pin connector 92-2 upon actuation of the sensor 13. Air is drawn primarily into the cartridge 70 through one or more air inlet ports 44. The one or more air inlet ports 44 may be located along the outer housing 16, 17 of the cartridge 70 and power supply section 72 or at the coupled interfaces 74, 84. Upon completing the connection between the cartridge 70 and the power supply section 72, the control circuitry 11 may electrically connect the at least one power supply 12 with the conductive element 31 of the cartridge 70 through at least pin connector 92-1. The control circuitry 11 may electrically connect the at least one power supply 12 to the heating element 24 and the conductive element 31 through separate, independent electrical circuits, including the separate, independent pathways 99-1 and 99-2 illustrated in FIG. 1B.

The sensor 13 may be configured to sense an air pressure drop and initiate application of voltage from the power supply 12 to the heating element 24. As shown in the example embodiment illustrated in FIG. 1B, some example embodiments of the power supply section 72 include a heater activation light 48 configured to glow when the heating element 24 is activated. The heater activation light 48 may include a light emitting diode (LED). Moreover, the heater activation light 48 may be arranged to be visible to an adult vaper during vaping. In addition, the heater activation light 48 may be utilized for e-vaping system diagnostics or to indicate that recharging is in progress. The heater activation light 48 may also be configured such that the adult vaper may activate and/or deactivate the heater activation light 48 for privacy. As shown in FIG. 1A and FIG. 1B, the heater activation light 48 may be located on the tip end of the e-vaping device 60. In some example embodiments, the heater activation light 48 may be located on a side portion of the outer housing 17.

In addition, the at least one air inlet port 44*a* is located adjacent to the sensor 13, such that the sensor 13 may sense air flow indicative of an adult vaper initiating a vaping, and activate the power supply 12 and the heater activation light 48 to indicate that the heating element 24 is working.

Further, the control circuitry 11 may control the supply of electrical power to the heating element 24 responsive to the sensor 13. In some example embodiments, the control circuitry 11 is configured to adjustably control the electrical power supplied to the heating element 24. Adjustably controlling the supply of electrical power may include controlling the supply of electrical power such that supplied electrical power has a determined set of characteristics, where the determined set of characteristics may be adjusted. To adjustably control the supply of electrical power, the control circuitry 11 may control the supply of electrical power such that electrical power having one or more characteristics determined by the control circuitry 11 is supplied to the heating element 24. Such one or more selected characteristics may include one or more of voltage and current of the electrical power. Such one or more selected characteristics may include a magnitude of the electrical power. It will be understood that adjustably controlling the supply of electrical power may include determining a set of characteristics of electrical power and controlling the supply of electrical power such that electrical power supplied to the heating element 24 has the determined set of characteristics.

In some example embodiments, the control circuitry 11 may include a maximum, time-period limiter. In some example embodiments, the control circuitry 11 may include a manually operable switch for an adult vaper to initiate a vaping. The time-period of the electric current supply to the heating element 24 may be given, or alternatively pre-set (e.g., prior to controlling the supply of electrical power to the heating element 24), depending on the amount of pre-vapor formulation desired to be vaporized. In some example embodiments, the control circuitry 11 may control the supply of electrical power to the heating element 24 as long as the sensor 13 detects a pressure drop.

To control the supply of electrical power to heating element 24, the control circuitry 11 may execute one or more instances of computer-executable program code. The control circuitry 11 may include a processor and a memory. The memory may be a computer-readable storage medium storing computer-executable code.

The control circuitry 11 may include processing circuitry including, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. In some example embodiments, the control circuitry 11 may be at least one of an application-specific integrated circuit (ASIC) and an ASIC chip.

The control circuitry 11 may be configured as a special purpose machine by executing computer-readable program code stored on a storage device. The program code may include program or computer-readable instructions, software elements, software modules, data files, data structures, and/or the like, capable of being implemented by one or more hardware devices, such as one or more of the control circuitry mentioned above. Examples of program code include both machine code produced by a compiler and higher level program code that is executed using an interpreter.

The control circuitry 11 may include one or more electronic storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a USB flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device through a network interface, rather than through a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, through a wired interface, an air interface, and/or any other like medium.

The control circuitry 11 may be a special purpose machine configured to execute the computer-executable code to control the supply of electrical power to heating element 24. In some example embodiments, an instance of computer-executable code, when executed by the control circuitry 11, causes the control circuitry 11 to control the supply of electrical power to heating element 24 according to an activation sequence. Controlling the supply of electrical power to heating element 24 may be referred to herein interchangeably as activating the one or more heating element 24.

Still referring to FIG. 1A and FIG. 1B, when activated, the heating element 24 may heat a portion of the dispensing interface 30 surrounded by the heating element 24 for less than about 10 seconds. Thus, the power cycle (or maximum vaping length) may range in period from about 2 seconds to about 10 seconds (e.g., about 3 seconds to about 9 seconds, about 4 seconds to about 8 seconds or about 5 seconds to about 7 seconds).

In some example embodiments, one or more of the heating element 24 and the conductive element 31 are electrically coupled to the control circuitry 11. The control circuitry 11 may adjustably control the supply of electrical power to the heating element 24 to control an amount of heat generated by the heating element 24. The control circuitry 11 may adjustably control the supply of electrical power based on a relationship between the amount (magnitude) of electrical power supplied and an amount of heat generated by the heating element 24.

In some example embodiments, the control circuitry 11 is configured to adjustably control the supply of electrical power to the heating element 24 to control the temperature of one or more of the dispensing interface 30 and pre-vapor formulation held therein. The control circuitry 11 may adjustably control the supply of electrical power to the heating element 24 based on a relationship between the amount of electrical power supplied and a temperature of one or more of the dispensing interface 30 and pre-vapor formulation included therein.

In some example embodiments, a relationship between the amount of electrical power supplied to the heating element 24 and a measured temperature of one or more of the dispensing interface 30 and pre-vapor formulation held therein may be stored in a lookup table ("LUT"). The LUT may include an array of temperature values and associated electrical power values. For example, the LUT may include a set of temperature values, and the array may associate each separate temperature value with a separate electrical power value.

The separate electrical power values corresponding to each of the separate values of temperature in the array may be determined experimentally. For example, an amount of power supplied to the heating element 24 may be measured concurrently with a temperature of one or more of the dispensing interface 30 and pre-vapor formulation held therein being measured. The concurrently-measured temperature and amount of electrical power may be entered into the array of the LUT.

The control circuitry 11 may access the LUT to determine an electrical power value that is associated with a measured temperature of one or more of the dispensing interface 30 and pre-vapor formulation held therein. The control circuitry 11 may control the supply of electrical power to the heating element 24 according to the determined electrical power value. For example, the control circuitry 11 may determine a value of a measured temperature of one or more of the dispensing interface 30 and pre-vapor formulation held therein based on at least one of a signal associated with the conductive element 31, a determined electrical resistance of the conductive element 31, a determined electrical resistivity of the conductive element 31, some combination thereof, etc. The control circuitry 11 may access the LUT and search for an electrical power value that is associated with the value of the measured temperature in the array. Upon identifying the associated electrical power value, the control circuitry 11 may control the supply of electrical power to the heating element 24 such that the amount of electrical power supplied to the heating element 24 is the identified electrical power value.

The LUT may be stored at a storage device. The storage device may be included in the control circuitry 11. In some example embodiments, the storage device is included in the cartridge 70. The control circuitry 11 may access the LUT based on determining a value of a measured temperature of one or more of the dispensing interface 30 and pre-vapor formulation held therein.

The control circuitry 11 may be configured to determine a temperature of the dispensing interface 30 based on a determination of a temperature of a portion of the conductive element 31 extending through the interior of the dispensing interface 30. The temperature of the portion of the conductive element 31 may be associated with a temperature of an interior of the dispensing interface 30. The temperature of the portion of the conductive element 31 may be associated with a temperature of pre-vapor formulation held within the dispensing interface 30.

In some example embodiments, the temperature of the conductive element 31 may be associated with an average temperature of the dispensing interface 30, and the control circuitry 11 may be configured to control the supply of electrical power to the heating element 24 to control the average temperature of the dispensing interface 30.

In some example embodiments, the control circuitry 11 may be configured to determine a temperature of the conductive element 31 based on a determined electrical resistance of the conductive element 31. The control circuitry 11 may induce an electrical current through the conductive element 31 and measure the electrical resistance of the conductive element 31 based on one or more of the current and the voltage at separate ends of the conductive element 31. The control circuitry 11 may be configured to determine a temperature of the conductive element 31 based on a determined relationship between the electrical resistance of the conductive element 31 and the temperature of the conductive element 31. Such a relationship may be based on one or more of the temperature coefficient of electrical resistivity and the temperature coefficient of electrical resistance of the conductive element 31.

The control circuitry 11 may be configured to determine a temperature of one or more portions of the dispensing interface 30, including pre-vapor formulation held in the dispensing interface 30, based on a determined relationship between the electrical resistance of the conductive element 31 and the temperature of the one or more portions of the dispensing interface 30. Such a relationship may be based on one or more of the temperature coefficient of electrical resistivity and the temperature coefficient of electrical resistance of the conductive element 31.

In some example embodiments, a relationship between electrical resistance of the conductive element 31 and a measured temperature of one or more of the dispensing interface 30 and pre-vapor formulation held therein may be stored in a lookup table ("LUT"). The LUT may be separate from the LUT, described above, that associates electrical power values with temperature values. In some example embodiments, the LUT that associates electrical resistance values and temperature values may be the same LUT that also associates the temperature values with electrical power values.

The LUT may include an array of electrical resistance values and associated temperature values. For example, the LUT may include a set of electrical resistance values, and the array may associate each separate electrical resistance value with a separate temperature value.

The separate temperature values corresponding to each of the separate values of electrical resistance in the array may be determined experimentally. For example, an electrical resistance of the conductive element 31 may be measured concurrently with a temperature of one or more of the dispensing interface 30 and pre-vapor formulation held therein being measured. The concurrently-measured temperature and electrical resistance values may be entered into the array of the LUT.

The control circuitry 11 may access the LUT to determine a temperature value that is associated with a determined electrical resistance of the conductive element 31. The control circuitry 11 may thus determine a temperature of one or more of the dispensing interface 30 and pre-vapor formulation held therein based on a determined electrical resistance of the conductive element 31.

In some example embodiments, the control circuitry 11 is configured to detect electrical resistance changes of at least 1 milliohm with an accuracy of 3-4° C. In some example embodiments, the control circuitry 11 is configured to detect electrical resistance changes of less than 1 milliohm. For example, the control circuitry 11 may be configured to detect electrical resistance changes of at least 0.1 milliohms (100 microohms).

As mentioned above with reference to FIG. 1A and FIG. 1B, the temperature coefficient of electrical resistivity of the conductive element 31 (also referred to herein as a second temperature coefficient of electrical resistivity) is greater than the temperature coefficient of electrical resistivity of the heating element 24 (also referred to herein as a first temperature coefficient of electrical resistivity). Thus, the control circuitry 11 may determine a temperature of one or more portions of the dispensing interface 30, including pre-vapor formulation held in the dispensing interface 30, with greater accuracy and precision based on determining the resistance of the conductive element 31, relative to processing sensor data, including electrical resistance data, generated by an element located external to the dispensing interface 30, including the heating element 24.

Improved accuracy and precision of temperature determinations by control circuitry 11 may enable improved control of the temperature of dispensing interface 30 and pre-vapor formulation held in the dispensing interface 30. Furthermore, the control circuitry 11 may be configured to provide improved mitigation of a probability of overheating of one or more of the dispensing interface 30 and pre-vapor formulation held in the dispensing interface 30. Overheating of the pre-vapor formulation may result in degradation of the pre-vapor formulation. Such degradation may occur based on chemical reactions involving the pre-vapor formulation.

Vapors generated based on vaporization of a non-degraded pre-vapor formulation may provide an improved sensory experience relative to vapors generated based on vaporization of an at least partially degraded pre-vapor formulation. Therefore, control circuitry 11, configured to determine temperatures in the dispensing interface 30 by measuring an electrical resistance of the conductive element 31 may be configured to control the supply of electrical power to the heating element 24 to provide an improved sensory experience.

In some example embodiments, because the conductive element 31 extends through an interior of the dispensing interface 30, the temperature of one or more of a material comprising the dispensing interface 30 and pre-vapor formulation held in the dispensing interface 30 may be determined based on a determined temperature of the conductive element 31. The control circuitry 11 may thus be configured to adjustably control the supply of electrical power to the heating element 24 based on a determined temperature of one or more of a material comprising the dispensing interface 30 and pre-vapor formulation held therein.

The control circuitry 11 may be configured to adjustably control the supply of electrical power to the heating element 24 to maintain the temperature of one or more of the dispensing interface 30 and pre-vapor formulation held therein at or below a threshold temperature value. The threshold temperature value may be associated with a temperature above which one or more of the pre-vapor formulation or one or more materials included in the dispensing interface 30 are overheated. Overheating may result in degradation of pre-vapor formulation. As a result, by adjustably controlling the supply of electrical power to the heating element 24 based on a measured electrical resistance of the conductive element 31, the control circuitry 11 may mitigate a probability of overheating of one or more of the dispensing interface 30 and the pre-vapor formulation held therein. Such mitigation may result in an improvement of the sensory experience provided by a vapor generated through vaporization of pre-vapor formulation held in the dispensing interface 30.

The control circuitry 11 may be configured to maintain the temperature of one or more of the dispensing interface 30 and pre-vapor formulation held therein at or below a threshold temperature value based on controlling the supply of electrical power according to a lookup table ("LUT") that associates separate values of temperature with separate values of electrical power. The LUT may include values of electrical power associated with separate temperature values at or above the threshold temperature value. Each of these electrical power values may be an amount of electrical power that, when supplied to the heating element 24, results in one or more of the dispensing interface 30 and pre-vapor formulation held therein cooling to a temperature that is equal to or smaller than the threshold temperature value.

The electrical power values included in the entries of the LUT may be determined experimentally. For example, an amount of power supplied to the heating element 24 may be measured concurrently with a temperature of one or more of the dispensing interface 30 and pre-vapor formulation held therein being measured. An electrical power value associated with a temperature value that exceeds the threshold temperature value may be an amount of electrical power that is experimentally determined to coincide with a measured temperature that is less than the threshold temperature by a particular margin. The value of the margin may be a constant value. In some example embodiments, based on controlling the supply of electrical power to the heating element 24 according to a LUT, the control circuitry 11 may adjust the amount of electrical power supplied to maintain the measured temperature at or below a threshold value.

In some example embodiments, the reservoir 22 is configured to hold different pre-vapor formulations. For example, the reservoir 22 may include one or more sets of storage media, where the one or more sets of storage media are configured to hold different pre-vapor formulations.

In some example embodiments, the dispensing interface 30 includes an absorbent material, the absorbent material being arranged in fluidic communication with the heating element 24. The absorbent material may include a wick having an elongated form and arranged in fluidic communication with the reservoir 22. The wick may include a wicking material. The wicking material may be a fibrous wicking material. The wicking material may extend into reservoir 22.

A pre-vapor formulation, as described herein, is a material or combination of materials that may be transformed into a vapor. For example, the pre-vapor formulation may be a liquid, solid and/or gel formulation including, but not limited to, water, beads, solvents, active ingredients, ethanol, plant extracts, natural or artificial flavors, and/or pre-vapor formulation such as glycerin and propylene glycol. Different pre-vapor formulations may include different elements. Different pre-vapor formulations may have different properties. For example, different pre-vapor formulations may have different viscosities when the different pre-vapor formulations are at a common temperature. One or more of pre-vapor formulations may include those described in U.S. Patent Application Publication No. 2015/0020823 to Lipowicz et al. filed Jul. 16, 2014 and U.S. Patent Application Publication No. 2015/0313275 to Anderson et al. filed Jan. 21, 2015, the entire contents of each of which is incorporated herein by reference thereto.

The pre-vapor formulation may include nicotine or may exclude nicotine. The pre-vapor formulation may include one or more tobacco flavors. The pre-vapor formulation may include one or more flavors that are separate from one or more tobacco flavors.

In some example embodiments, a pre-vapor formulation that includes nicotine may also include one or more acids. The one or more acids may be one or more of pyruvic acid, formic acid, oxalic acid, glycolic acid, acetic acid, isovaleric acid, valeric acid, propionic acid, octanoic acid, lactic acid, levulinic acid, sorbic acid, malic acid, tartaric acid, succinic acid, citric acid, benzoic acid, oleic acid, aconitic acid, butyric acid, cinnamic acid, decanoic acid, 3,7-dimethyl-6-octenoic acid, 1-glutamic acid, heptanoic acid, hexanoic acid, 3-hexenoic acid, trans-2-hexenoic acid, isobutyric acid, lauric acid, 2-methylbutyric acid, 2-methylvaleric acid, myristic acid, nonanoic acid, palmitic acid, 4-pentenoic acid, phenylacetic acid, 3-phenylpropionic acid, hydrochloric acid, phosphoric acid, sulfuric acid and combinations thereof.

The storage medium of one or more reservoirs 22 may be a fibrous material including at least one of cotton, polyethylene, polyester, rayon and combinations thereof. The fibers may have a diameter ranging in size from about 6 microns to about 15 microns (e.g., about 8 microns to about 12 microns or about 9 microns to about 11 microns). The storage medium may be a sintered, porous or foamed material. Also, the fibers may be sized to be irrespirable and may have a cross-section that has a Y-shape, cross shape, clover shape or any other suitable shape. In some example embodiments, one or more reservoirs 22 may include a filled tank lacking any storage medium and containing only pre-vapor formulation.

Still referring to FIG. 1A and FIG. 1B, the reservoir 22 may be sized and configured to hold enough pre-vapor formulation such that the e-vaping device 60 may be configured for vaping for at least about 200 seconds. The e-vaping device 60 may be configured to allow each vaping to last a maximum of about 5 seconds.

The dispensing interface 30 may include a wicking material that includes filaments (or threads) having a capacity to draw one or more pre-vapor formulations. For example, a dispensing interface 30 may be a bundle of glass (or ceramic) filaments, a bundle including a group of windings of glass filaments, etc., all of which arrangements may be capable of drawing pre-vapor formulation through capillary action by interstitial spacings between the filaments. The filaments may be generally aligned in a direction perpendicular (transverse) or substantially perpendicular to the longitudinal direction of the e-vaping device 60. In some example embodiments, the dispensing interface 30 may include one to eight filament strands, each strand comprising a plurality of glass filaments twisted together. The end portions of the dispensing interface 30 may be flexible and foldable into the confines of one or more reservoirs 22. The filaments may have a cross-section that is generally cross-shaped, clover-shaped, Y-shaped, or in any other suitable shape.

The dispensing interface 30 may include any suitable material or combination of materials, also referred to herein as wicking materials. Examples of suitable materials may be, but not limited to, glass, ceramic- or graphite-based materials. The dispensing interface 30 may have any suitable capillary drawing action to accommodate pre-vapor formulations having different physical properties such as density, viscosity, surface tension and vapor pressure.

In some example embodiments, the heating element 24 may include a wire coil that at least partially surrounds the dispensing interface 30. The wire coil may be referred to as a heating coil wire. The heating coil wire may be a metal wire and/or the heating coil wire may extend fully or partially along the length of the dispensing interface 30. The heating coil wire may further extend fully or partially around the circumference of the dispensing interface 30. In some example embodiments, the heating coil wire may or may not be in contact with the outer surface 30*a* of the dispensing interface 30.

The heating element 24 may be formed of any suitable electrically resistive materials. Examples of suitable electrically resistive materials may include, but not limited to, titanium, zirconium, tantalum and metals from the platinum group. Examples of suitable metal alloys include, but not limited to, stainless steel, nickel, cobalt, chromium, aluminum-titanium-zirconium, hafnium, niobium, molybdenum, tantalum, tungsten, tin, gallium, manganese and iron-containing alloys, and super-alloys based on nickel, iron, cobalt, stainless steel. For example, the heating element 24 may be formed of nickel aluminide, a material with a layer of alumina on the surface, iron aluminide and other composite materials, the electrically resistive material may optionally be embedded in, encapsulated or coated with an insulating material or vice-versa, depending on the kinetics of energy transfer and the external physicochemical properties required. The heating element 24 may include at least one material selected from the group consisting of stainless steel, copper, copper alloys, nickel-chromium alloys, super alloys and combinations thereof. In some example embodiments, the heating element 24 may be formed of nickel-chromium alloys or iron-chromium alloys. In some example embodiments, the heating element 24 may be a ceramic heater having an electrically resistive layer on an outside surface thereof.

The dispensing interface 30 may extend transversely across the central channel 61 between opposing portions of the reservoir 22. In some example embodiments, the dispensing interface 30 may extend parallel or substantially parallel to a longitudinal axis of the central channel 61. In some example embodiments, including the example embodiment illustrated in FIG. 1B, the dispensing interface 30 may extend orthogonally or substantially orthogonally to the longitudinal axis of the central channel 61.

In some example embodiments, the heating element 24 is a porous material that incorporates a resistance heater formed of a material having a relatively high electrical resistance capable of generating heat relatively quickly.

In some example embodiments, the cartridge 70 may be replaceable. In other words, once the pre-vapor formulation of the cartridge 70 is depleted, only the cartridge 70 need be replaced. In some example embodiments, the entire e-vaping device 60 may be disposed once the reservoir 22 is depleted.

In some example embodiments, the e-vaping device 60 may be about 80 mm to about 110 mm long and about 7 mm to about 8 mm in diameter. For example, the e-vaping device 60 may be about 84 mm long and may have a diameter of about 7.8 mm.

373 FIG. 2A is a cross-sectional view of a dispensing interface along line IIA-IIA' according to some example embodiments. FIG. 2B is a cross-sectional view of a dispensing interface along line IIB-IIB' according to some example embodiments. The dispensing interface 30 shown in FIGS. 2A and 2B may be the dispensing interface 30 shown in FIG. 1B.

As shown in FIG. 2A and FIG. 2B, the heating element 24 may extend along an outer surface 30*a* of the dispensing interface 30. As also shown, in some example embodiments, the heating element 24 may include a heating coil wire that extends around the outer surface 30*a*. The heating element 24 may extend in contact (e.g., direct contact) with the outer surface 30*a* of the dispensing interface 30. In some example embodiments, one or more portions of the heating element 24 extend in proximity to the outer surface 30*a* and are isolated from direct contact with (i.e., separated from) the outer surface 30*a* through a gap space (not shown in FIG. 2A and FIG. 2B).

As shown in FIG. 2A and FIG. 2B, the heating element 24 may generate heat based on electrical power being carried by the heating element 24. The heat may be transmitted, as shown by arrows 200 in FIG. 2A and FIG. 2B, from the heating element 24 to an interior 30*b* of the dispensing interface 30. In some example embodiments, the dispensing interface 30 holds pre-vapor formulation 202 within the interior 30*b* of the dispensing interface 30. As a result, the transmitted 200 heat generated by the heating element 24 may be absorbed by pre-vapor formulation 202 held in the interior 30*b* and cause the temperature of the pre-vapor formulation 202 to increase.

As shown in FIG. 2A and FIG. 2B, the conductive element 31 extends through the interior 30*b* of the dispensing interface 30. At least a portion of the conductive element 31 may be a wire. At least a portion of the conductive element 31 may extend along a longitudinal axis of the dispensing interface 30, as shown in FIG. 2A and FIG. 2B. In some example embodiments, at least a portion of the conductive element 31 may be a coil.

As shown in FIG. 2A and FIG. 2B, heat generated by heating element 24, and transmitted 200 through the interior 30*b* of the dispensing interface 30, may be absorbed by the conductive element 31. In some example embodiments, the conductive element 31 may be heated by portions of the interior 30*b* of the dispensing interface 30. For example, the conductive element 31 may be heated by one or more of a material included in the dispensing interface 30 and pre-vapor formulation 202. In some example embodiments, the conductive element 31 may be heated to a temperature based on a temperature of one or more of a material included in the dispensing interface 30 and pre-vapor formulation 202. As a result, a temperature of one or more of a material included in the dispensing interface 30 and pre-vapor formulation 202 may be determined based on a temperature of the conductive element 31.

When the temperature of the conductive element 31 is based at least in part upon a temperature of the pre-vapor formulation 202, excessive temperatures of the pre-vapor formulation 202 may be more rapidly detected and mitigated through adjustable control of electrical power supplied to the heating element 24.

Figure 3:
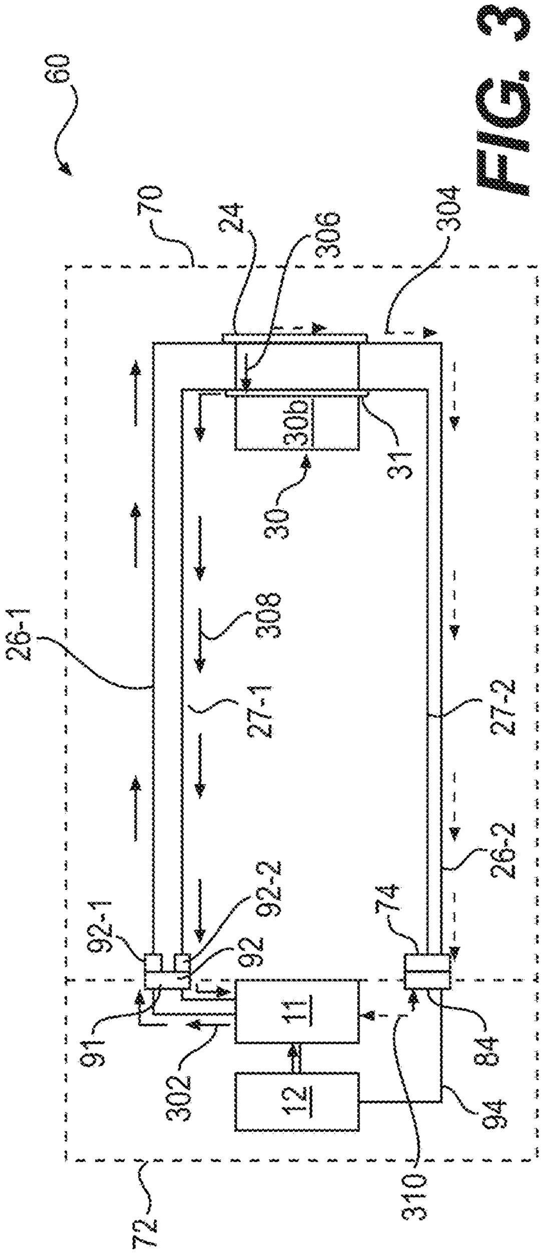
FIG. 3 is a schematic of an e-vaping device that shows signal propagation through the dispensing interface, according to some example embodiments.

FIG. 3 is a schematic of an e-vaping device that shows signal propagation through the dispensing interface 30, according to some example embodiments.

In some example embodiments, a dispensing interface 30 in an e-vaping device 60 may establish a bridge electrical circuit 306 through an interior 30*b* of the dispensing interface 30 based on an amount of pre-vapor formulation held in the interior 30*b* of the dispensing interface 30. The bridge electrical circuit 306 may be established between the heating element 24 and the conductive element 31. In some example embodiments, a bridge electrical circuit 306 through an interior 30*b* of the dispensing interface 30 is an electrical short.

The bridge electrical circuit 306 may be established when an amount of pre-vapor formulation 202 held in the interior 30*b* of the dispensing interface 30 is greater than or equal to a threshold amount of pre-vapor formulation. The threshold amount of pre-vapor formulation, in some example embodiments, may be a threshold volume of pre-vapor formulation. The threshold volume of pre-vapor formulation may be a threshold proportion of a volume of pre-vapor formulation that may be held in the interior 30*b* of the dispensing interface 30. The volume of pre-vapor formulation that may be held in the interior 30*b* of the dispensing interface 30 may be referred to herein as a “fill volume” of the dispensing interface 30. The threshold proportion may be 10% of the fill volume of the dispensing interface 30. The amount of pre-vapor formulation 202 held in the interior 30*b* of the dispensing interface 30 may be associated with an amount of pre-vapor formulation held in the cartridge 70 of the e-vaping device 60 according to a relationship therebetween.

In some example embodiments, the bridge electrical circuit 306 through the interior 30*b* of the dispensing interface 30 may have an electrical resistance. The magnitude of the electrical resistance of the bridge electrical circuit 306 may be based on the amount of pre-vapor formulation 202 held in the interior 30*b* of the dispensing interface 30. Thus, the magnitude of the electrical resistance of the bridge electrical circuit 306 may be associated with an amount of pre-vapor formulation held in the cartridge 70 of the e-vaping device 60 according to a relationship.

In some example embodiments, the magnitude of the electrical resistance of the bridge electrical circuit 306 between the heating element 24 and the conductive element 31 through the interior 30*b* of the dispensing interface 30 may be inversely proportional to the amount of pre-vapor formulation held in the cartridge 70. In some example embodiments, an amount of pre-vapor formulation held in the cartridge 70 may be determined based on at least one of determining whether a bridge electrical circuit 306 is established through the interior 30*b* of the dispensing interface 30 and determining a magnitude of an electrical resistance of the bridge electrical circuit 306.

In some example embodiments, an e-vaping device 60 includes control circuitry 11 configured to detect a bridge electrical circuit 306 through the dispensing interface 30 based on monitoring one of the electrical leads 26-1 to 26-2, 27-1 to 27-2, and 94 for a bridge electrical signal. The bridge electrical signal may be generated when the bridge electrical circuit 306 is established such that a signal propagates through the bridge electrical circuit 306. The control circuitry 11 may determine whether an amount of pre-vapor formulation held in the cartridge 70 is greater than or equal to a threshold amount based on whether the bridge electrical circuit 306 is established.

In some example embodiments, the control circuitry 11 may transmit an initial electrical signal 302 into the cartridge 70 through electrical lead 26-1 coupled to heating element 24. It will be understood that, in some example embodiments, the initial electrical signal 302 may be transmitted on electrical lead 27-1 coupled to conductive element 31.

As shown in FIG. 3, initial electrical signal 302 passes along electrical lead 26-1 into heating element 24. When a bridge electrical circuit 306 through the dispensing interface 30 is absent, based on an amount of pre-vapor formulation held in the interior 30*b* of the dispensing interface 30 being less than a threshold amount, a return electrical signal 304 may pass from heating element 24 to the control circuitry 11 through electrical lead 26-2, interfaces 74, 84, lead 94, and power supply 12. The control circuitry 11 may detect the return electrical signal 304 being carried on electrical lead 26-2.

In some example embodiments, including the example embodiment illustrated in FIG. 3, the control circuitry 11 may be electrically coupled 310 to interface 84 such that the control circuitry 11 is configured to detect a return electrical signal 304 received at the interface 84 from at least one of leads 26-2 and 27-2. As shown in FIG. 3, the control circuitry 11 may be electrically coupled 310 to the interface 84 independently of at least the power supply 12. In some example embodiments, including the example embodiment illustrated in FIG. 3, the control circuitry 11 may be electrically coupled 310 to the interface 84 independently of at least the lead 94. It will be understood that detection of an electrical signal may include receiving the electrical signal through an electrical connection without being explicitly stated as such. For example, the control circuitry 11 may detect a return electrical signal 304 received at interface 84 based on the electrical signal 304 passing from the interface 84 to the control circuitry 11 through an electrical pathway that electrically couples 310 the control circuitry 11 to the interface 84.

In some example embodiments, the control circuitry 11 may determine that a bridge electrical circuit 306 through the dispensing interface 30 is absent based at least in part upon determining an absence of an electrical signal being carried on electrical lead 27-1.

The control circuitry 11 may determine that a bridge electrical circuit 306 through the dispensing interface 30 is absent based on a determination that a magnitude of the return electrical signal 304 is above a threshold level. For example, the threshold level of the return electrical signal 304 magnitude may be 1 milliamp. The threshold level may be a proportion of a magnitude of the initial electrical signal 302. A loss of magnitude of the return electrical signal 304 relative to the initial electrical signal 302 may be based on resistance losses through the heating element 24 and electrical leads 26-1 to 26-2. Where the magnitude of return electrical signal 304 is above a threshold level, the reduction of magnitude of the return electrical signal 304 relative to the initial electrical signal 302 may be attributed to resistance losses and not a bridge electrical circuit 306 through the interior 30*b* of dispensing interface 30.

As shown in FIG. 3, when a bridge electrical circuit 306 through the interior 30*b* of the dispensing interface 30 is established, at least a portion of the initial electrical signal 302 may propagate through the bridge electrical circuit 306. As shown in FIG. 3, when the initial electrical signal 302 propagates from the heating element 24 to the conductive element 31 through the bridge electrical circuit 306, the conductive element 31 carries a bridge electrical signal 308.

In some example embodiments, the bridge electrical signal 308 may be carried by at least one of lead 27-1 and lead 27-2 coupled to the conductive element 31. In the example embodiment illustrated in FIG. 3, for example, the bridge electrical signal 308 is carried from conductive element 31 to the control circuitry 11 through at least lead 27-1. In some example embodiments, the bridge electrical signal 308 is carried from conductive element 31 to the control circuitry 11 through at least lead 27-2.

The control circuitry 11 may detect the bridge electrical signal 308. In some example embodiments, the control circuitry 11 detects an electrical signal based on receiving the electrical signal through one or more electrical connections with an electrical lead carrying the signal. As shown in FIG. 3, for example, the control circuitry 11 may detect the bridge electrical signal 308 based on receiving the bridge electrical signal 308 through lead 27-1 and connector element 91.

The control circuitry 11 may determine, based on detection of the bridge electrical signal 308, that a bridge electrical circuit 306 through the dispensing interface 30 is established. The control circuitry 11 may thus determine that at least a threshold amount of pre-vapor formulation is held within the cartridge 70. The control circuitry 11 may determine an amount of pre-vapor formulation held in the cartridge 70 based on processing the bridge electrical signal 308. Such processing may include accessing a lookup table ("LUT") that includes an array, where the array associates separate bridge electrical signal 308 values with separate, respective pre-vapor formulation amounts.

In some example embodiments, the control circuitry 11 may determine that an amount of pre-vapor formulation held in the cartridge 70 is less than a threshold amount based on determining that an electrical resistance of the bridge electrical circuit 306 is greater than or equal to a threshold electrical resistance. In some example embodiments, the control circuitry 11 may determine that an amount of pre-vapor formulation held in the cartridge 70 is greater than or equal to the threshold amount based on determining that an electrical resistance of the bridge electrical circuit 306 is less than the threshold electrical resistance. The threshold electrical resistance is associated with the threshold amount of pre-vapor formulation 202. In some example embodiments, the threshold electrical resistance may be 1 milliohm. In some example embodiments, the threshold electrical resistance may have a magnitude that is less than 1 milliohm. For example, the threshold electrical resistance may be 0.1 milliohms.

In some example embodiments, the control circuitry 11 may determine that an amount of pre-vapor formulation held in the cartridge 70 is less than a threshold amount based on determining that a magnitude of a change in electrical resistance of the bridge electrical circuit 306 is greater than or equal to a threshold magnitude. In some example embodiments, the control circuitry 11 may determine that an amount of pre-vapor formulation held in the cartridge 70 is greater than or equal to the threshold amount based on determining that a magnitude of a change in electrical resistance of the bridge electrical circuit 306 is less than the threshold magnitude. The threshold magnitude is associated with the threshold amount of pre-vapor formulation 202. In some example embodiments, the threshold magnitude may be 1 milliohm. In some example embodiments, the threshold magnitude may be less than 1 milliohm. For example, the threshold magnitude may be 0.1 milliohms.

In some example embodiments, the control circuitry 11 may provide information indicating an amount of pre-vapor formulation in the cartridge 70. The information may be provided through an interface on the e-vaping device 60. Such an interface may include a display interface that is configured to indicate an amount of pre-vapor formulation held in the cartridge 70 based on one or more of a quantity of activated lights, a color of one or more activated lights, etc.

In some example embodiments, the control circuitry 11 may control a supply of electrical power to the heating element 24 based on a determined amount of pre-vapor formulation held in the cartridge 70. For example, the control circuitry 11 may disable the supply of electrical power to the heating element 24 when the amount of pre-vapor formulation held in the cartridge 70 is determined to be less than a threshold amount. Such disabling may mitigate a probability of degradation of any remaining pre-vapor formulation held in the first section.

Figure 4:
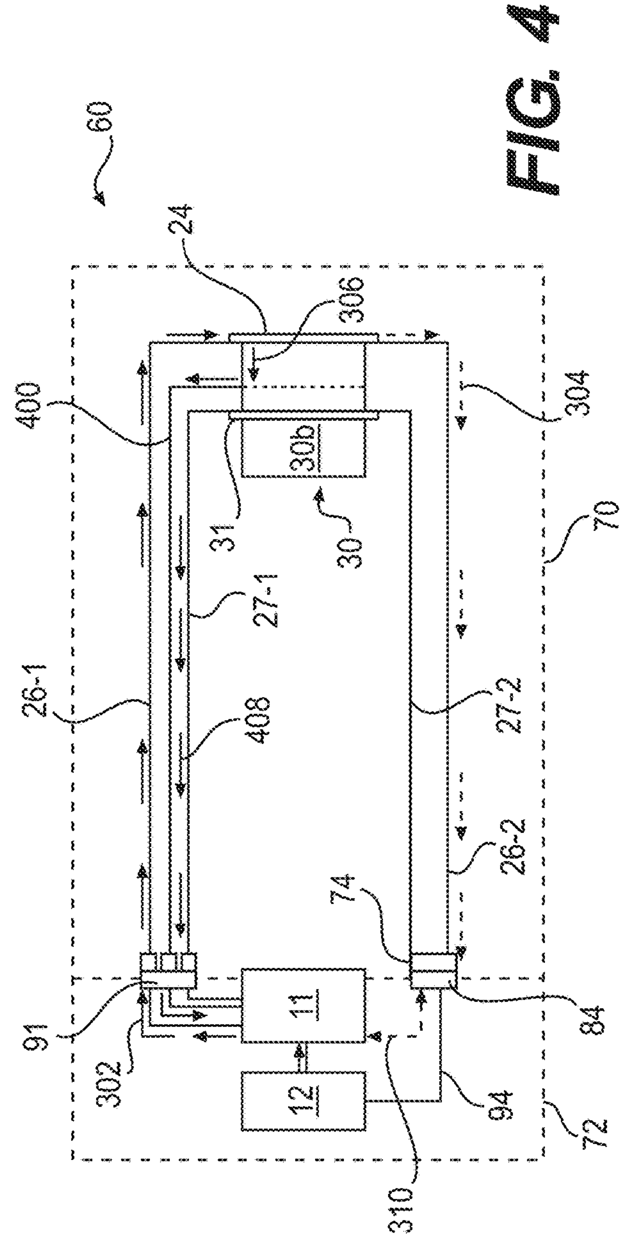
FIG. 4 is a schematic of an e-vaping device that shows signal propagation through the dispensing interface, according to some example embodiments.

FIG. 4 is a schematic of an e-vaping device that shows signal propagation through the dispensing interface 30, according to some example embodiments.

In some example embodiments, an e-vaping device 60 includes a sensor wire 400. The sensor wire 400 may be coupled to the dispensing interface 30 independently of the conductive element 31 and the heating element 24. The sensor wire 400 may be electrically coupled to the power supply section 72 such that the control circuitry 11 is electrically coupled to the sensor wire 400 through one or more electrical connections between the cartridge 70 and the power supply section 72.

In some example embodiments, the sensor wire 400 is configured to carry an electrical signal transmitted through an interior 30*b* of the dispensing interface 30, including a bridge electrical circuit 306 through the interior 30*b* of the dispensing interface 30. The control circuitry 11 may determine whether an amount of pre-vapor formulation 202 held in the interior 30*b* of the dispensing interface 30 is greater than or equal to a threshold amount based on at least one of a determination of whether the sensor wire 400 is carrying a bridge electrical signal 408 and a measured electrical resistance of the bridge electrical circuit 306. In the absence of a bridge electrical circuit 306 through the interior 30*b* of the dispensing interface 30, electrical signals may be absent from being carried on the sensor wire 400. In some example embodiments, the sensor wire 400 is coupled to an exterior portion of the dispensing interface 30. In some example embodiments, the sensor wire 400 extends through at least a portion of an interior 30*b* of the dispensing interface 30.

As shown in FIG. 4, an initial electrical signal 302 may be transmitted along one of the electrical leads 26-1 and 27-1.

When a bridge electrical circuit 306 through the dispensing interface 30 is absent, based on an amount of pre-vapor formulation held in the interior 30*b* of the dispensing interface 30 being less than a threshold amount, a return electrical signal 304 may pass from heating element 24 to the control circuitry 11 through electrical lead 26-2 and at least interfaces 74, 84. The control circuitry 11 may determine, based at least in part upon determining an absence of an electrical signal being carried on sensor wire 400, that a bridge electrical circuit 306 through the dispensing interface 30 is absent. The control circuitry 11 may detect the return electrical signal 304 being carried on electrical lead 26-2. It will be understood that detection of an electrical signal may include receiving the electrical signal through an electrical connection without being explicitly stated as such.

The control circuitry 11 may determine, based at least in part upon a detection of return electrical signal 304, that a bridge electrical circuit 306 through the dispensing interface 30 is absent. The control circuitry 11 may determine that a bridge electrical circuit 306 through the dispensing interface 30 is absent based on a determination that a magnitude of the return electrical signal 304 is greater than or equal to a threshold level. The threshold level may be a proportion of a magnitude of the initial electrical signal 302. A low of magnitude of the return electrical signal 304 relative to the initial electrical signal 302 may be based on resistance losses through the heating element 24 and electrical leads 26-1 to 26-2. Where the magnitude of return electrical signal 304 is greater than or equal to a threshold level, the reduction of magnitude of the return electrical signal 304 relative to the initial electrical signal 302 may be attributed to resistance losses and not a bridge electrical circuit 306 through dispensing interface 30.

When a bridge electrical circuit 306 is established through the interior 30*b* of the dispensing interface 30, the initial electrical signal 302 may propagate through the bridge electrical circuit 306 to be carried as a bridge electrical signal 408 on the sensor wire 400. The control circuitry 11 may detect the bridge electrical signal 408 based on the bridge electrical signal 408 being received at the control circuitry 11 through an electrical connection to the sensor wire 400. The control circuitry 11 may determine that at least a threshold amount of pre-vapor formulation is held in the cartridge 70 based on a detection of the bridge electrical signal 408 on the sensor wire 400. In some example embodiments, the threshold amount of pre-vapor formulation held in the cartridge 70 is 5 milliliters. In some example embodiments, the threshold amount of pre-vapor formulation held in the cartridge 70 is a threshold volume of pre-vapor formulation. The threshold volume of pre-vapor formulation may be a threshold proportion of a volume of pre-vapor formulation that may be held in a reservoir 22 of the cartridge 70. The volume of pre-vapor formulation that may be held in the reservoir 22 may be referred to herein as a "fill volume" of the cartridge 70. The threshold proportion may be 20% of the fill volume of the cartridge 70. The control circuitry 11 may determine an amount of pre-vapor formulation in the cartridge 70 based on processing the bridge electrical signal 408. The control circuitry 11 may determine whether the amount of pre-vapor formulation in the cartridge 70 is greater than or equal to a threshold amount based on processing the bridge electrical signal 408.

In some example embodiments, the control circuitry 11 may control the transmission of initial electrical signal 302 to cause the initial electrical signal 302 to be transmitted on sensor wire 400. The control circuitry 11 may determine that at least a threshold amount of pre-vapor formulation is held in the cartridge 70 based on a detection of the bridge electrical signal 408 on at least one of the electrical leads coupled to the heating element 24 or the conductive element 31.

Figure 5:
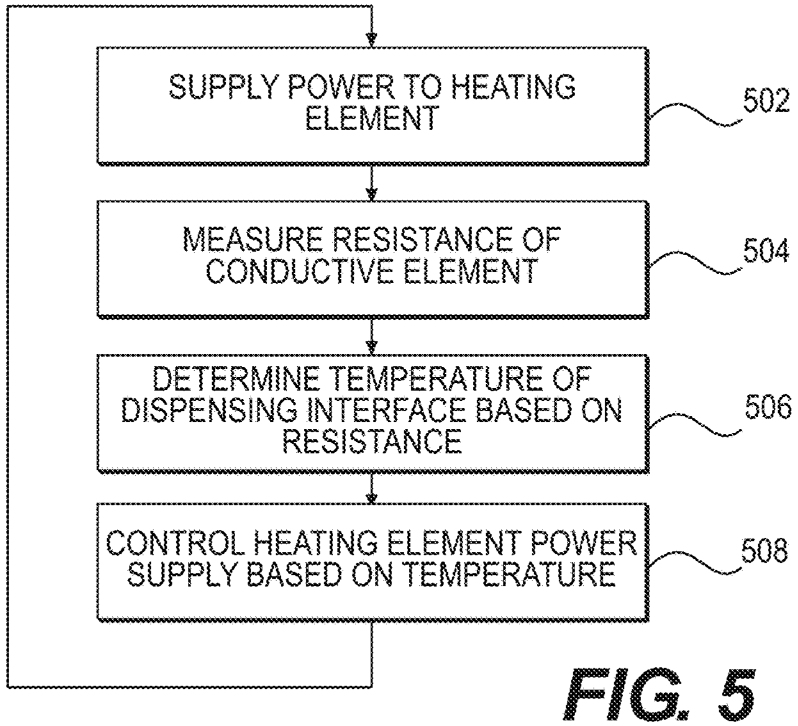
FIG. 5 is a flow chart illustrating a method for controlling electrical power supplied to a heating element in a cartridge based on a resistance of a conductive element in the dispensing interface, according to some example embodiments.

FIG. 5 is a flow chart illustrating a method for controlling electrical power supplied to a heating element in a cartridge based on a resistance of a conductive element in the dispensing interface, according to some example embodiments. The controlling may be implemented with regard to any of the example embodiments of cartridges described herein. The controlling may be implemented by control circuitry 11 included in any of the example embodiments of e-vaping devices 60 included herein.

Referring to FIG. 5, at 502, the control circuitry 11 controls the supply of electrical power to a heating element 24 in the cartridge 70. The control circuitry 11 may determine one or more characteristics of the electrical power. The control circuitry 11 may control the supply of electrical power such that supplied electrical power has the one or more determined characteristics.

At 504, the control circuitry 11 measures a resistance of a conductive element 31 extending through an interior 30*b* of a dispensing interface 30. The heating element 24 to which the control circuitry 11 controls the supply of electrical power at 502 may be coupled to the dispensing interface 30. The heating element 24 may generate heat based on the supplied electrical power, and the generated heat may be transmitted from the heating element 24 to the dispensing interface 30. As the conductive element 31 extends through an interior 30*b* of the dispensing interface 30, the conductive element 31 may be at least partially heated by heat conducted through the dispensing interface 30 from the heating element 24. When a pre-vapor formulation 202 is held in the interior 30*b* of the dispensing interface 30, the conductive element 31 may be heated by at least one of a material included in the dispensing interface 30 and pre-vapor formulation 202 that is heated by the heating element.

The conductive element 31 may be heated to a temperature associated with a temperature of the pre-vapor formulation 202 in the interior 30*b* of the dispensing interface 30. An electrical resistance of the conductive element 31 may change according to a temperature of the conductive element 31 when the conductive element 31 is heated. The control circuitry 11 may measure the electrical resistance of the conductive element 31. The control circuitry 11 may determine a temperature of at least a portion of the conductive element 31 extending through the dispensing interface 30 based on the measured electrical resistance. In some example embodiments, the control circuitry 11 may measure a resistance of the conductive element 31 by inducing a selected voltage or a selected current in the conductive element 31. In some example embodiments, the control circuitry 11 may measure a resistance of the conductive element 31 by measuring one or more of voltage, current, and signal magnitude at one or more electrical connections between the conductive element 31 and the control circuitry 11. For example, the control circuitry 11 may monitor one or more of voltage and current of electrical power directed between the control circuitry 11 and at least one of the electrode elements 93, 95 and the power supply 12.

At 506, the control circuitry 11 determines a temperature of at least one of the dispensing interface 30 and pre-vapor formulation 202 held in the interior 30*b* of the dispensing interface 30 based on the measured electrical resistance of the conductive element 31. The control circuitry 11 may determine a temperature of at least one of the dispensing interface 30 and pre-vapor formulation 202 based on a determined temperature of the conductive element 31. The control circuitry 11 may determine the temperature of the conductive element 31 based on the measured electrical resistance of the conductive element 31. The control circuitry 11 may determine the temperature of the conductive element 31 based on accessing a lookup table ("LUT") and identifying a temperature value associated with the measured electrical resistance value in the LUT.

At 508, the control circuitry 11 adjustably controls the supply of electrical power to the heating element 24 based on a determined temperature. The determined temperature may be a determined temperature of at least one of the conductive element 31, the dispensing interface 30, and the pre-vapor formulation 202. The control circuitry 11 may adjustably control the supply of electrical power based on a relationship between heating element electrical power and the determined temperature of one or more of the conductive element 31, the dispensing interface 30, and the pre-vapor formulation 202. The control circuitry 11 may adjustably control the supply of electrical power based on accessing a lookup table ("LUT") and identifying an electrical power magnitude value associated with the temperature value in the LUT.

The control circuitry 11 may control the supply of electrical power to maintain the determined temperature within a particular temperature range. In some example embodiments, where the control circuitry 11 determines a temperature of the pre-vapor formulation 202 held in the interior 30*b* of the dispensing interface 30 based on the measured electrical resistance of the conductive element 31, the control circuitry 11 may control the supply of electrical power to the heating element 24 to maintain the temperature of the pre-vapor formulation 202 below a threshold temperature value. A threshold temperature of the pre-vapor formulation 202 may be associated with a temperature above which a probability of chemical reactions, degradation, etc. associated with the pre-vapor formulation 202 reaches a threshold probability value. In some example embodiments, the threshold temperature is 300 degrees Fahrenheit.

In some example embodiments, where the control circuitry 11 determines a temperature of the dispensing interface 30 based on the measured electrical resistance of the conductive element 31, the control circuitry 11 may control the supply of electrical power to the heating element 24 to maintain the temperature of the dispensing interface 30 below a threshold temperature value. For example, the threshold temperature value may be a temperature at which the pre-vapor formulation may undergo a decomposition reaction. In another example, the threshold temperature value may be a temperature at which the pre-vapor formulation may react with one or more elements of the cartridge 70, etc.

Figure 6:
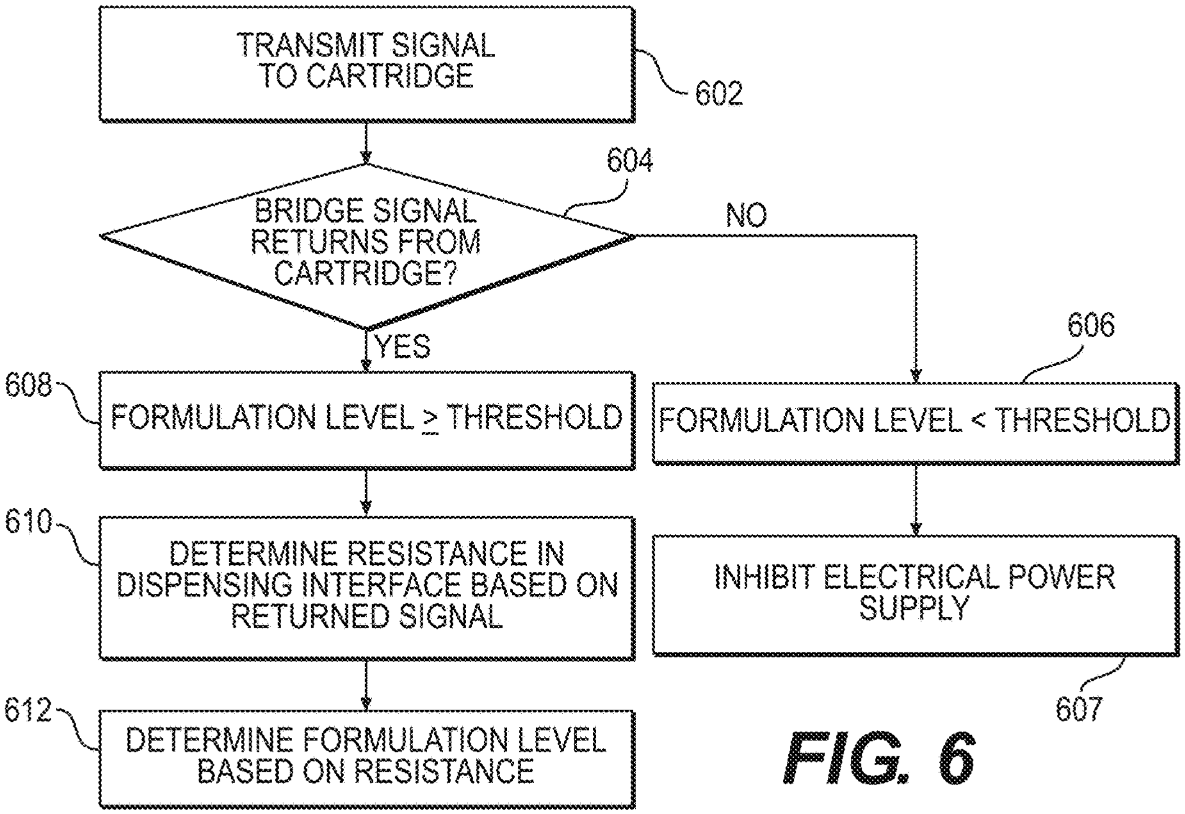
FIG. 6 is a flow chart illustrating a method for determining an amount of pre-vapor formulation in a cartridge based on a signal through the dispensing interface, according to some example embodiments.

FIG. 6 is a flow chart illustrating a method for determining an amount of pre-vapor formulation in a cartridge based on a signal through the dispensing interface 30, according to some example embodiments. The determining may be implemented with regard to any of the example embodiments of cartridges described herein. The determining may be implemented by control circuitry 11 included in any of the example embodiments of e-vaping devices 60 included herein.

Referring to FIG. 6, at 602, the control circuitry 11 transmits an initial electrical signal to the cartridge 70. The initial electrical signal may be transmitted through an electrical connection between the control circuitry 11 and one or more of an electrical lead coupled to a heating element 24, an electrical lead coupled to a conductive element 31, and a sensor wire 400.

At 604, the control circuitry 11 determines whether a bridge electrical signal is detected through an electrical connection between the control circuitry 11 and one or more of an electrical lead coupled to a heating element 24, an electrical lead coupled to a conductive element 31, and a sensor wire 400. A bridge electrical signal may be generated based on the initial electrical signal at least partially propagating through the interior 30*b* of the dispensing interface 30 between the heating element 24 and the conductive element 31 through the bridge electrical circuit 306. For example, where the control circuitry 11 transmits the initial electrical signal to the heating element 24 through an electrical connection with an electrical lead 26-1, the bridge electrical signal may be generated based on the initial electrical signal propagating from the heating element 24 to the conductive element 31 through the dispensing interface 30. In such an example, the control circuitry 11 may determine that a bridge electrical signal is detected based on receiving the bridge electrical signal through an electrical connection to an electrical lead 27-2 coupled to the conductive element 31.

Where the electrical connection to the electrical lead 27-2 coupled to the conductive element 31 is separate from an electrical connection to an electrical lead 26-2 coupled to the heating element 24, the control circuitry 11 may determine that a bridge electrical signal is detected based on receiving the bridge electrical signal through the electrical connection to the electrical lead 27-2 when the initial electrical signal is transmitted through the electrical connection to the electrical lead 26-1. In another example, the control circuitry 11 may determine receipt of a bridge electrical signal based on receiving the bridge electrical signal through an electrical connection to an electrical lead 26-2 coupled to the heating element 24 when the initial electrical signal is transmitted through an electrical connection an electrical lead 27-1 coupled to the conductive element 31.

In some example embodiments, the control circuitry 11 is electrically coupled to a sensor wire 400 directly coupled to the dispensing interface 30 independently of the conductive element 31 and the heating element 24. Where a signal propagates through the dispensing interface 30, the sensor wire 400 may carry the bridge electrical signal. Thus, the control circuitry 11 may receive a bridge electrical signal through an electrical connection to the sensor wire 400.

In some example embodiments, the initial electrical signal is omitted, and the control circuitry 11, at 604, determines whether a bridge electrical signal is generated based on electrical power supplied to the heating element 24 at least partially propagating through the interior of the dispensing interface 30. The control circuitry 11 may determine whether a bridge electrical signal is generated based on determining whether the bridge electrical signal is received at the control circuitry 11. For example, the control circuitry 11 may determine that the bridge electrical signal is generated based on receiving the bridge electrical signal through at least the interfaces 74, 84.

In some example embodiments, the control circuitry 11 may monitor the heating element 24 for an indication of a bridge electrical circuit 306 at 604 independently of transmitting a signal at 602. For example, the control circuitry 11 may detect a bridge electrical circuit 306 through the dispensing interface 30 based on monitoring electrical power carried by one or more of electrical leads 26-1 and 26-2 coupled to the heating element 24. The control circuitry 11 may determine a presence of a bridge electrical circuit 306 through the dispensing interface 30 based on detecting a drop in current carried on a trailing electrical lead 26-2 coupled to a ground pin connector 92-N in the cartridge 70.

In some example embodiments, the control circuitry 11 may monitor the conductive element 31 for an indication of a bridge electrical circuit 306 at 604 independently of transmitting a signal at 602. For example, the control circuitry 11 may detect a bridge electrical circuit 306 through the dispensing interface 30 based on monitoring electrical power carried by one or more of the electrical leads 27-1 and 27-2 coupled to the conductive element 31. The control circuitry 11 may determine a presence of a bridge electrical circuit 306 through the dispensing interface 30 based on detecting a rise in current carried on a trailing electrical lead 27-2 coupled to a ground pin connector 92-N in the cartridge 70.

In some example embodiments, the control circuitry 11 may monitor a sensor wire 400 for an indication of a bridge electrical circuit 306 at 604 independently of transmitting a signal at 602. For example, the control circuitry 11 may detect a bridge electrical circuit 306 across the dispensing interface 30 based on monitoring electrical power carried by the sensor wire 400 from the dispensing interface 30 material. The control circuitry 11 may determine a presence of a bridge electrical circuit 306 through the dispensing interface 30 based on detecting a current carried on the sensor wire 400.

At 606, where a bridge electrical signal is not received at the control circuitry 11, the control circuitry 11 determines that an amount of pre-vapor formulation in the cartridge 70 is less than a threshold amount. In some example embodiments, pre-vapor formulation enables a bridge electrical circuit 306 through the dispensing interface 30. When the amount of pre-vapor formulation in the cartridge 70 is less than a threshold amount, the amount of pre-vapor formulation 202 held in the interior **30*b* of the dispensing interface 30 may be insufficient to establish a bridge electrical circuit 306 through the dispensing interface 30 between the heating element 24 and the conductive element 31**.

At 607, the control circuitry 11 may at least partially inhibit a supply of electrical power to the heating element 24 based on determining that an amount of pre-vapor formulation in the cartridge 70 is less than a threshold amount.

Returning to 604, where a bridge electrical signal is received at the control circuitry 11, at 608 the control circuitry 11 may determine that the amount of pre-vapor formulation in the cartridge is at least a threshold amount. The threshold amount may be a minimum amount of pre-vapor formulation associated with supporting vaping. In some example embodiments, the threshold amount is a minimum amount of pre-vapor formulation associated with a minimum rate of vapor generation based on vaporizing pre-vapor formulation.

At 610, the control circuitry 11 measures an electrical resistance of the bridge electrical circuit 306 to the bridge electrical signal. The control circuitry 11 may compare the initial electrical signal and the bridge electrical signal to determine a resistance of the dispensing interface 30. For example, based on comparing voltages at connections to each of the electrical leads to the heating element 24 and the conductive element 31, the control circuitry 11 may determine an electrical resistance of the bridge electrical circuit 306.

At 612, the control circuitry 11 determines an amount of pre-vapor formulation in the cartridge 70 based on the measured electrical resistance of the bridge electrical circuit 306. The resistance may be associated with the amount of pre-vapor formulation 202 held in the interior **30*b* of the dispensing interface 30. For example, the electrical resistance of the bridge electrical circuit 306 may be related to the amount of pre-vapor formulation 202 in the dispensing interface by a particular relationship, including an inversely proportional relationship between the pre-vapor formulation 202 amount and electrical resistance. The amount of pre-vapor formulation 202 held in the interior 30*b* of the dispensing interface 30 may be associated with the amount of pre-vapor formulation held in the cartridge 70. For example, the amount of pre-vapor formulation in the cartridge 70 may be related to the amount of pre-vapor formulation 202 in the interior 30*b* of the dispensing interface 30** by a particular relationship, including a directly proportional relationship between the cartridge 70 pre-vapor formulation amount and the dispensing interface pre-vapor formulation 202 amount.

In some example embodiments, the control circuitry 11 determines that an amount of pre-vapor formulation in the cartridge 70 is less than a threshold amount based on the determined electrical resistance of the bridge electrical circuit 306. When the amount of pre-vapor formulation in the cartridge 70 is less than a threshold amount, the electrical resistance of the bridge electrical circuit 306 may be at least a threshold value. In some example embodiments, the control circuitry 11 may at least partially inhibit a supply of electrical power to the heating element 24 based on determining that an amount of pre-vapor formulation in the cartridge 70 is less than a threshold amount.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

We claim:

1. A device, comprising:

a dispensing interface configured to hold a pre-vapor formulation;

a heating element coupled to the dispensing interface, the heating element configured to heat the pre-vapor formulation held within the dispensing interface, the heating element extending along an outer surface of the dispensing interface; and a conductive element extending through an interior of the dispensing interface, the conductive element surrounded by the dispensing interface such that the conductive element is configured to be heated by at least one of the dispensing interface or the pre-vapor formulation at a temperature of at least one of the dispensing interface or the pre-vapor formulation.

2. The device of claim 1, wherein the conductive element at least partially extends along a central longitudinal axis of the dispensing interface.

3. The device of claim 1, wherein the dispensing interface includes a fibrous wicking material; and the conductive element is woven through an interior of the fibrous wicking material.

4. The device of claim 1, wherein the heating element includes a heater coil wire at least partially extending around the outer surface of the dispensing interface.

5. The device of claim 1, wherein the heating element has a first temperature coefficient of electrical resistivity;

the conductive element has a second temperature coefficient of electrical resistivity; and the second temperature coefficient of electrical resistivity is greater than the first temperature coefficient of electrical resistivity.

6. The device of claim 1, wherein the dispensing interface is configured to establish a bridge electrical circuit between the heating element and the conductive element when an amount of pre-vapor formulation held within the dispensing interface is greater than or equal to a threshold amount.

7. A device comprising:

a dispensing interface configured to hold a pre-vapor formulation;

a heating element coupled to the dispensing interface, the heating element configured to heat the pre-vapor formulation held within the dispensing interface, the heating element extending along an outer surface of the dispensing interface;

a conductive element extending through an interior of the dispensing interface, wherein the dispensing interface is configured to establish a bridge electrical circuit between the heating element and the conductive element when an amount of pre-vapor formulation held within the dispensing interface is greater than or equal to a threshold amount; and a sensor wire coupled to the dispensing interface separately from the conductive element and the heating element, the sensor wire being configured to carry an electrical signal propagating through the bridge electrical circuit.

8. An e-vaping device, comprising:

a cartridge, the cartridge including, a reservoir configured to hold the pre-vapor formulation, and the device of claim 1, wherein the dispensing interface of the device is configured to draw the pre-vapor formulation from the reservoir; and a power supply configured to selectively supply electrical power to the heating element.

9. The e-vaping device of claim 8, further comprising:

control circuitry configured to, determine an electrical resistance of the conductive element;

determine the temperature of the dispensing interface based on the electrical resistance of the conductive element; and control the electrical power supplied to the heating element based on the temperature of the dispensing interface.

10. The e-vaping device of claim 9, wherein the control circuitry is configured to control the electrical power supplied to the heating element to maintain the temperature of the dispensing interface below a threshold temperature.

11. The e-vaping device of claim 9, wherein the control circuitry is configured to detect changes in the electrical resistance of the conductive element, the changes having a magnitude of at least one milliohm.

12. The e-vaping device of claim 8, wherein, the dispensing interface is configured to establish a bridge electrical circuit between the heating element and the conductive element when an amount of pre-vapor formulation held within the dispensing interface is greater than or equal to a threshold amount.

13. An e-vaping device, comprising:

a cartridge, the cartridge including, a reservoir configured to hold a pre-vapor formulation, a dispensing interface configured to hold the pre-vapor formulation, a heating element coupled to the dispensing interface, the heating element configured to heat the pre-vapor formulation held within the dispensing interface, the heating element extending along an outer surface of the dispensing interface, and a conductive element extending through an interior of the dispensing interface, wherein the dispensing interface is configured to establish a bridge electrical circuit between the heating element and the conductive element when an amount of pre-vapor formulation held within the dispensing interface is greater than or equal to a threshold amount;

a power supply configured to selectively supply electrical power to the heating element; and control circuitry configured to, receive a bridge electrical signal, the bridge electrical signal being transmitted between the heating element and the conductive element through the bridge electrical circuit;

determine an electrical resistance of the bridge electrical circuit based on the bridge electrical signal; and determine an amount of pre-vapor formulation in the cartridge based on the determined electrical resistance of the bridge electrical circuit.

14. The e-vaping device of claim 13, wherein the control circuitry is configured to, transmit an initial electrical signal through at least a portion of at least one of the conductive element and the heating element; and determine the amount of pre-vapor formulation in the cartridge based on both the initial electrical signal and the bridge electrical signal.

15. The e-vaping device of claim 13, further comprising:

a sensor wire coupled to the dispensing interface separately from the conductive element and the heating element, the sensor wire being configured to carry the bridge electrical signal; and wherein the control circuitry is configured to receive the bridge electrical signal through the sensor wire.

16. The e-vaping device of claim 8, wherein the power supply includes a rechargeable battery.

17. The e-vaping device of claim 8, wherein the cartridge and the power supply are configured to be removably connected to each other.

* * * * *